(12) United States Patent
Okada

(10) Patent No.: US 7,872,808 B2
(45) Date of Patent: Jan. 18, 2011

(54) ZOOM LENS SYSTEM AND CAMERA INCLUDING THE SAME

(75) Inventor: Takashi Okada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 12/476,571

(22) Filed: Jun. 2, 2009

(65) Prior Publication Data
US 2009/0296232 A1 Dec. 3, 2009

(30) Foreign Application Priority Data
Jun. 3, 2008 (JP) .............................. 2008-145623

(51) Int. Cl.
G02B 15/14 (2006.01)
(52) U.S. Cl. ...................... 359/687; 359/689
(58) Field of Classification Search ................ 359/689, 359/687, 686
See application file for complete search history.

(56) References Cited
FOREIGN PATENT DOCUMENTS

| JP | 2005-106925 A | 4/2005 |
|---|---|---|
| JP | 2005-338740 A | 12/2005 |
| JP | 2006-084887 A | 3/2006 |
| JP | 2007-171371 A | 7/2007 |

*Primary Examiner*—Alicia M Harrington
(74) *Attorney, Agent, or Firm*—Canon U.S.A., Inc. I.P. Division

(57) ABSTRACT

A zoom lens system includes, in order from an object side to an image side, a first lens unit having positive optical power, a second lens unit having negative optical power, and a rear unit including at least one lens unit. During zooming, at least two lens units move so that intervals between the lens units adjacent to each other change. In such a zoom lens system, the second lens unit consists of a negative lens component formed of at least one material and a positive lens element, which are arranged in the stated order from the object side to the image side. A refractive index and an Abbe number of the at least one material forming the negative lens component and a refractive index of a material forming the positive lens element are appropriately set, whereby high optical performance is obtained.

8 Claims, 19 Drawing Sheets

ZOOM LENS SYSTEM AND CAMERA INCLUDING THE SAME

BACKGROUND OF THE INVENTION

1. Field of the Invention

The present invention relates to a zoom lens system and a camera including the same.

2. Description of the Related Art

In recent years, a camera such as a video camera, a digital still camera, a broadcasting camera, a monitoring camera which use a solid-state image pickup element, or a silver-halide film camera has provided high function and has been small in overall size.

A shooting optical system used in the camera is demanded to be a zoom lens system that has short overall length of a lens, small size, a high zoom ratio, and high definition.

Further, the shooting optical system is demanded to be a retractable zoom lens system including a configuration for reducing intervals between the respective lens units in non-shooting state to intervals different from those in shooting state and reducing a thickness (length in an optical axis direction) of the entire camera.

As a zoom lens system meeting those demands, there is known a zoom lens system that includes, in order from an object side to an image side, first, second, and third lens units respectively having positive, negative, and positive refractive powers and in which the respective lens units move to perform zooming (Japanese Patent Application Laid-Open No. 2005-106925 (corresponding to U.S. Pat. No. 7,123,422)).

There is also known a positive-lead zoom lens system that includes, in order from an object side to an image side, a lens unit having positive refractive power, a lens unit having negative refractive power, and a rear unit including one or more lens units following those lens units (Japanese Patent Application Laid-Open No. 2005-338740 (corresponding to U.S. Pat. No. 7,283,310) and Japanese Patent Application Laid-Open No. 2007-171371 (corresponding to U.S. Pat. No. 7,319,562)).

Japanese Patent Application Laid-Open No. 2005-338740 (corresponding to U.S. Pat. No. 7,283,310) and Japanese Patent Application Laid-Open No. 2007-171371 (corresponding to U.S. Pat. No. 7,319,562) disclose a zoom lens system that includes four lens units respectively having positive, negative, positive, and positive refractive powers in the stated order from an object side to an image side, and in which the respective lens units move to perform zooming.

Japanese Patent Application Laid-Open No. 2007-338740 (corresponding to U.S. Pat. No. 7,319,562) discloses a zoom lens system that includes a second lens unit including two lenses, i.e., a negative lens and a positive lens, and appropriately sets refractive powers of the components to realize a reduction in size of the entire system.

In recent years, translucent ceramics is developed. A shooting optical system employing the translucent ceramics as an optical material is known. The translucent ceramics have a high refractive index compared with optical glass and are excellent in hardness and strength. There is known a camera that realizes a reduction in thickness of an entire lens system making use of this characteristic (Japanese Patent Application Laid-Open No. 2006-84887 (corresponding to U.S. Pat. No. 7,407,334)).

In Japanese Patent Application Laid-Open No. 2006-84887 (corresponding to U.S. Pat. No. 7,407,334), translucent ceramics is used as a material of a negative lens of a cemented lens, which is formed by bonding a positive lens and the negative lens, to reduce lens thickness and realize a reduction in the entire lens system.

In recent years, there is a strong demand that a zoom lens system used in a camera should have a high zoom ratio and should be small in the overall lens system.

In general, in order to reduce the size of a zoom lens system, it is sufficient to reduce the number of lenses while increasing refractive powers of lens units forming the zoom lens system.

However, in such a zoom lens system, lens thickness increases, an effect of reduction in the length of the lens system is insufficient, and it is difficult to correct various aberrations.

Therefore, in order to realize a high zoom ratio and a reduction in size of the entire lens system, it is important to appropriately set a zoom type, the refractive powers of the lens units, a lens configuration forming the lens units, and the like.

In general, optical glass has a characteristic that, as a refractive index increases, an Abbe number decreases and dispersion increases.

On the other hand, it is known that ceramics has a higher refractive index compared with optical glass having an Abbe number same as that of the ceramics.

It is advantageous for aberration correction and a reduction in size of an entire optical system to use the ceramics having such a characteristic as an optical material.

However, even if a lens made of the ceramics is simply used for a zoom lens system, it is difficult to obtain high optical performance over an entire zoom range while realizing a reduction in size of the entire system.

In particular, in order to realize a high zoom ratio while reducing an effective diameter of a first lens unit to realize a reduction in the entire system in the above-mentioned positive-lead zoom lens system, it is important to appropriately set a lens configuration in a second lens unit. For example, it is important to select an appropriate material for lenses forming the second lens unit and to form the second lens unit with as small a number of lenses as possible.

In the positive-lead zoom lens system, if a lens configuration of the second lens unit is inappropriate, it is extremely difficult to obtain high optical performance over the entire zoom range while realizing a reduction in size of the entire system.

SUMMARY OF THE INVENTION

It is an object of the present invention to provide a small zoom lens system that has a high zoom ratio and is capable of obtaining high optical performance over an entire zoom range.

In an exemplary zoom lens system according to the present invention, a first lens unit having positive optical power, a second lens unit having negative optical power, and a rear unit including at least one lens unit are arranged in the stated order from an object side to an image side. During zooming, at least two lens units move so that intervals between lens units adjacent to each other change.

In such a zoom lens system, the second lens unit consists of a negative lens component formed of at least one material and a positive lens element. The negative lens component and the positive lens element are arranged in the stated order from the object side to the image side. A refractive index of the at least one material forming the negative lens component with respect to d-line, an Abbe number of the at least one material forming the negative lens component, and a refractive index of a material forming the positive lens element with respect to d-line are appropriately set.

Further features of the present invention will become apparent from the following description of exemplary embodiments with reference to the attached drawings.

DESCRIPTION OF THE EMBODIMENTS

Hereinafter, embodiments of a zoom lens system according to the present invention and a camera including the same are described in accordance with the accompanying drawings.

The zoom lens system according to this embodiment includes a first lens unit having positive refractive power, a second lens unit having negative refractive power, and a rear unit including at least one lens unit in the stated order from an object side to an image side.

During zooming, at least the second lens unit is moved.

The rear unit includes, for example, a third lens unit having positive refractive power or includes the third lens unit having positive refractive power and a fourth lens unit having positive refractive power in the stated order from the object side to the image side.

Alternatively, the rear unit includes the third lens unit having positive refractive power, the fourth lens unit having positive refractive power, and a fifth lens unit having positive refractive power in the stated order from the object side to the image side.

In the present invention, the rear unit may include four or more lens units.

Figure 1:
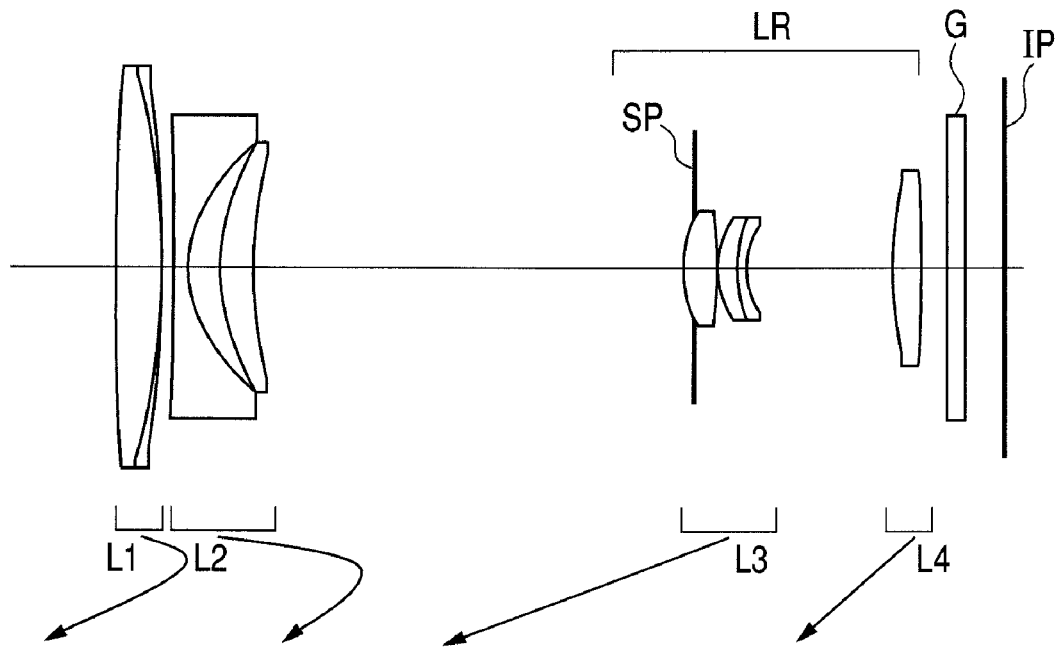
FIG. 1 is an optical sectional view in a first embodiment of the present invention.
Figure 2:
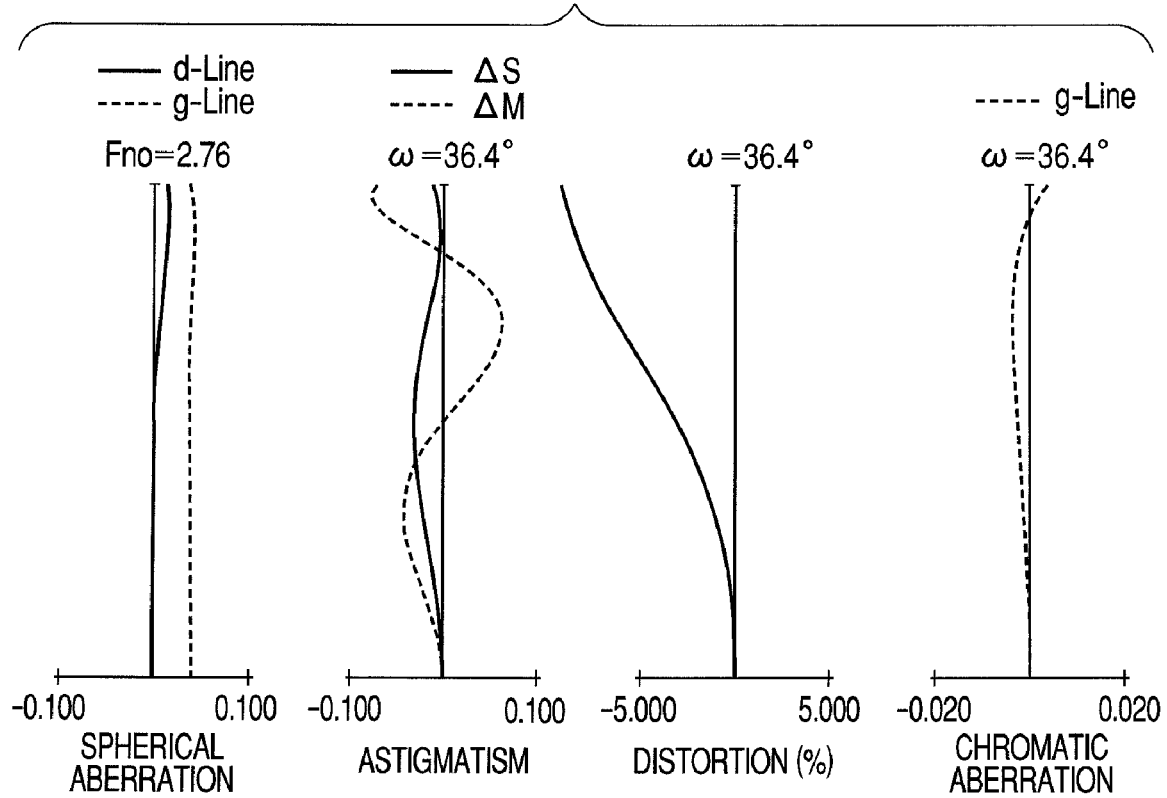
FIG. 2 is a diagram of aberrations at a wide-angle end in the first embodiment.
Figure 3:
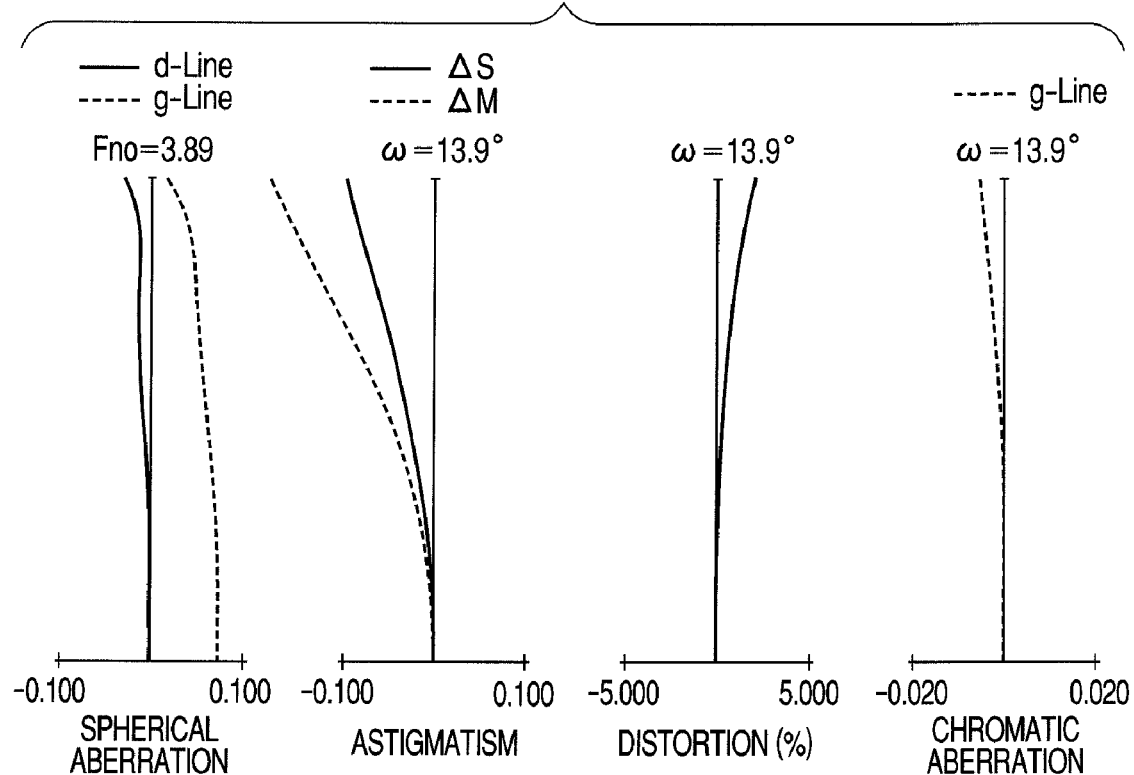
FIG. 3 is a diagram of aberrations in an intermediate zoom position in the first embodiment.
Figure 4:
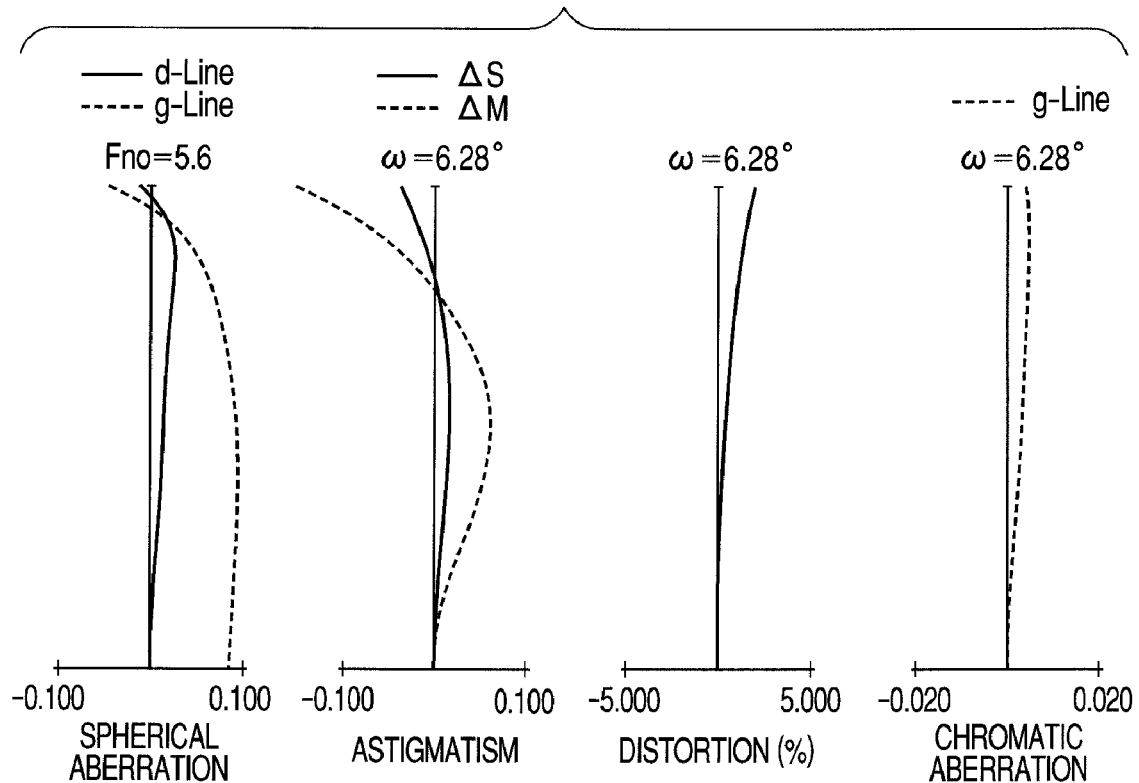
FIG. 4 is a diagram of aberrations at a telephoto end in the first embodiment.

FIG. 1 is a sectional view of a main part at a wide-angle end (short focal length end) of a zoom lens system according to a first embodiment (lens sectional view). FIGS. 2 to 4 are aberration diagrams at the wide-angle end, in an intermediate focal length, and at a telephoto end (long focal length end) in the zoom lens system according to the first embodiment, respectively.

Figure 5:
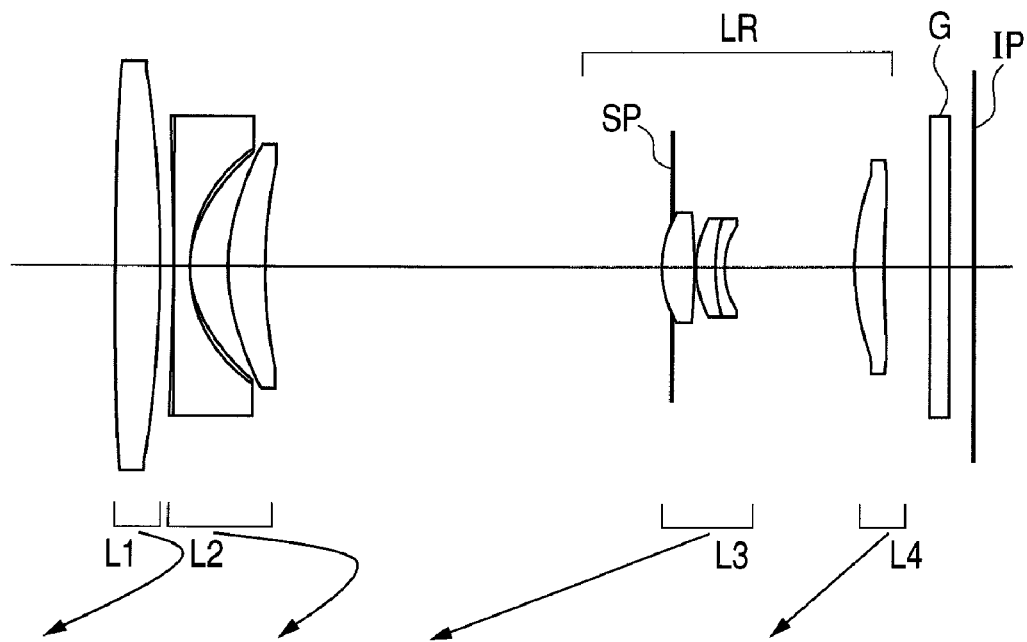
FIG. 5 is an optical sectional view in a second embodiment of the present invention.
Figure 6:
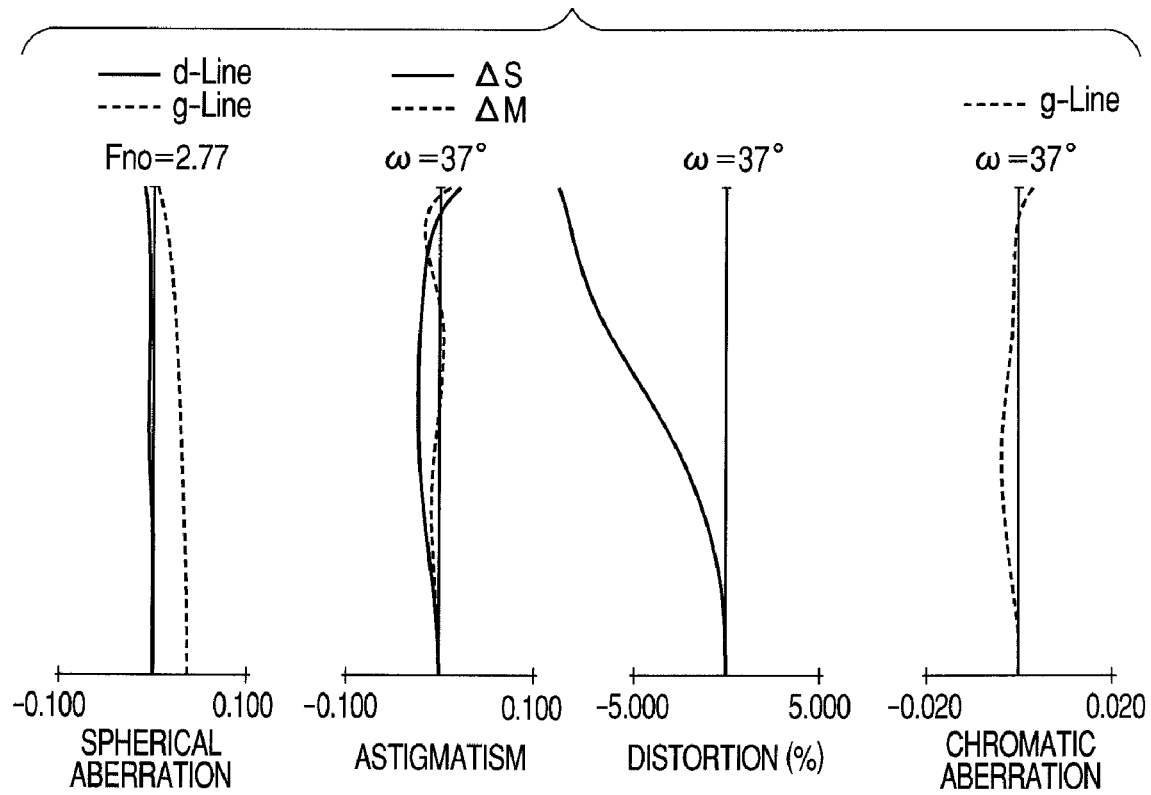
FIG. 6 is a diagram of aberrations at a wide-angle end in the second embodiment.
Figure 7:
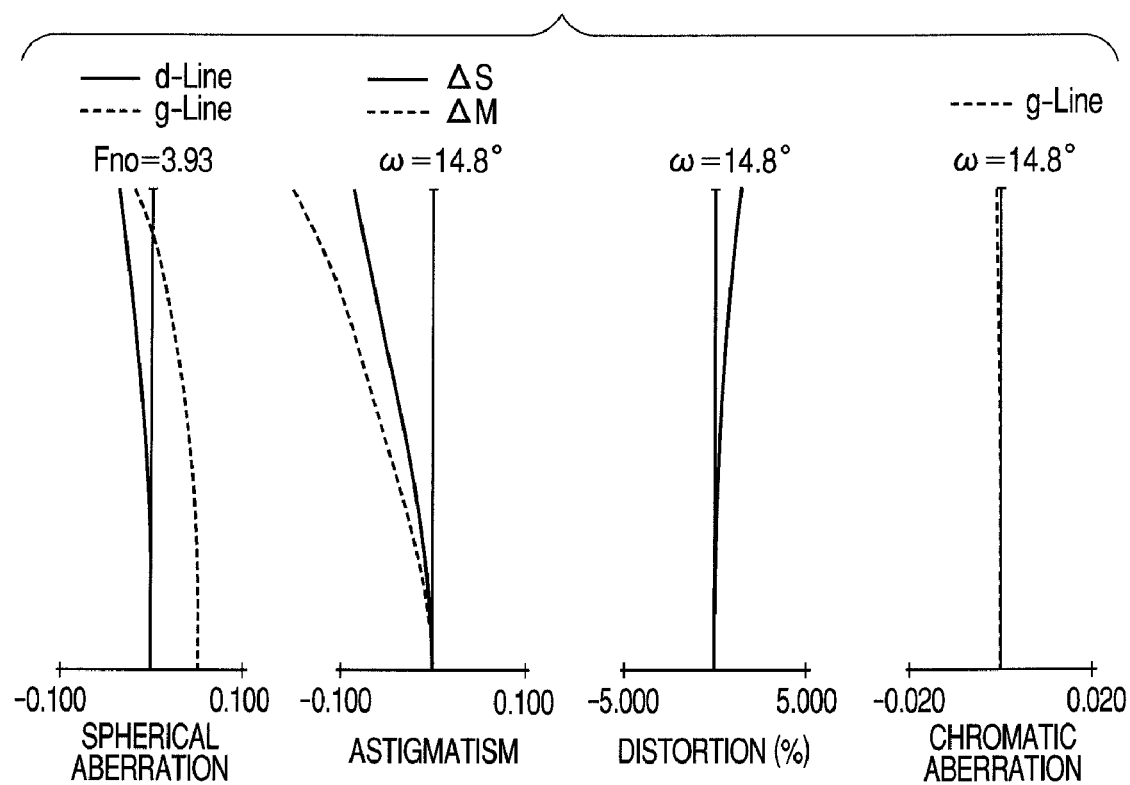
FIG. 7 is a diagram of aberrations in an intermediate zoom position in the second embodiment.
Figure 8:
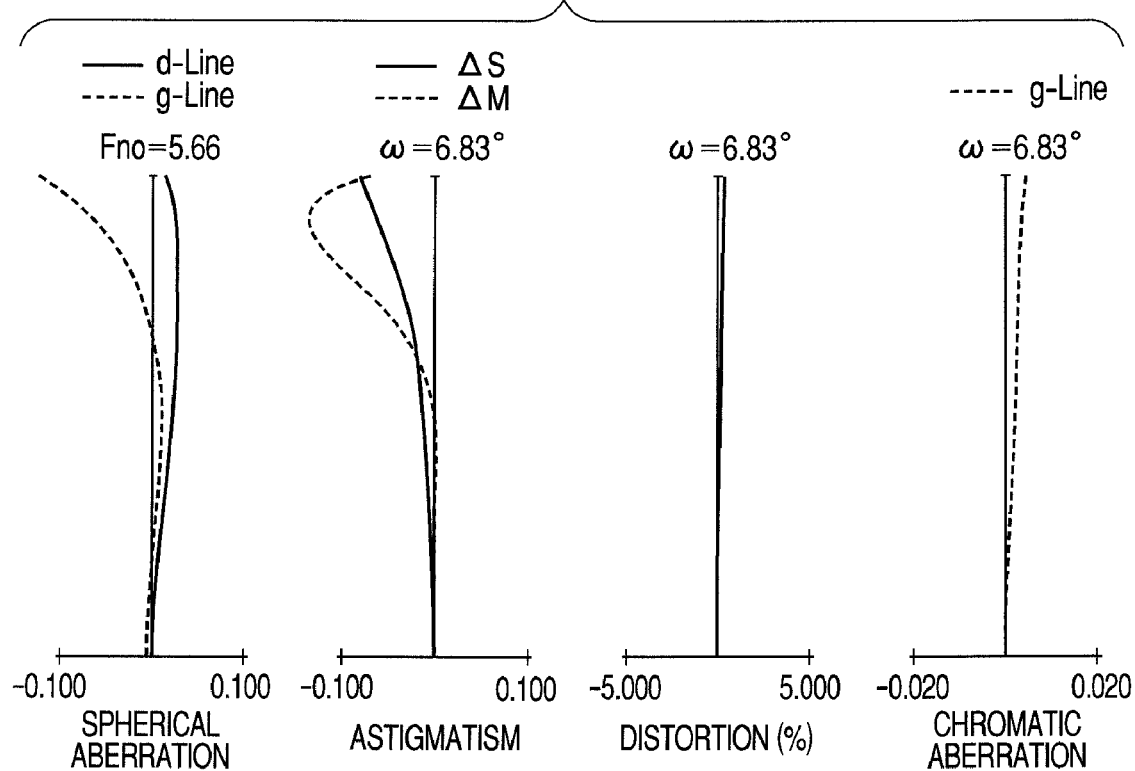
FIG. 8 is a diagram of aberrations at a telephoto end in the second embodiment.

FIG. 5 is a sectional view of a lens main part at a wide-angle end of a zoom lens system according to a second embodiment. FIGS. 6 to 8 are aberration diagrams at the wide-angle end, in an intermediate focal length, and at a telephoto end in the zoom lens system according to the second embodiment, respectively.

Figure 9:
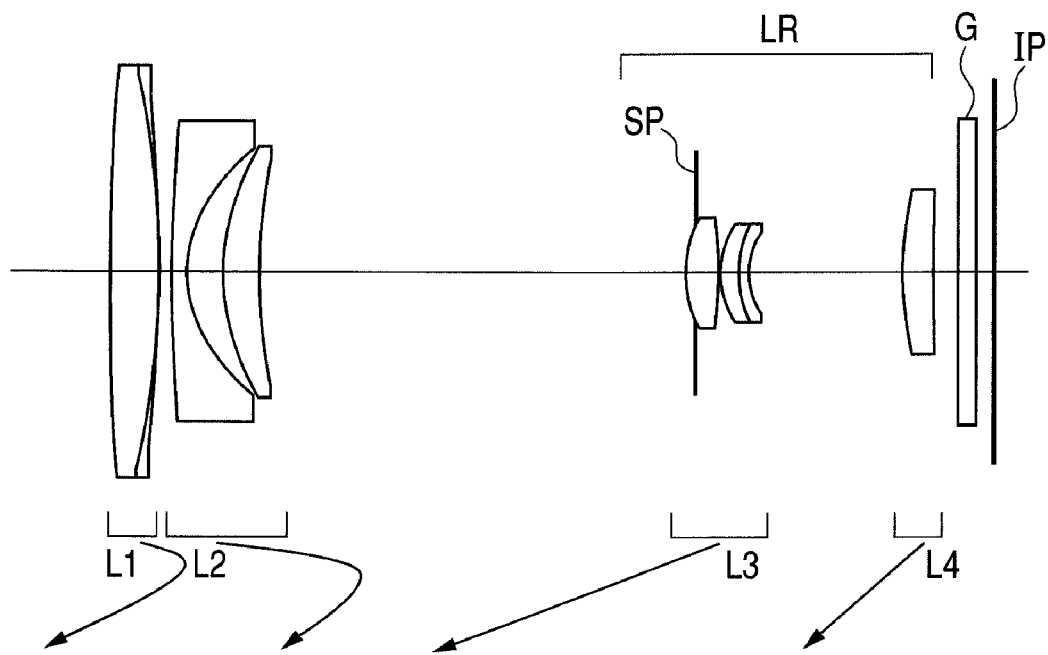
FIG. 9 is an optical sectional view in a third embodiment of the present invention.
Figure 10:
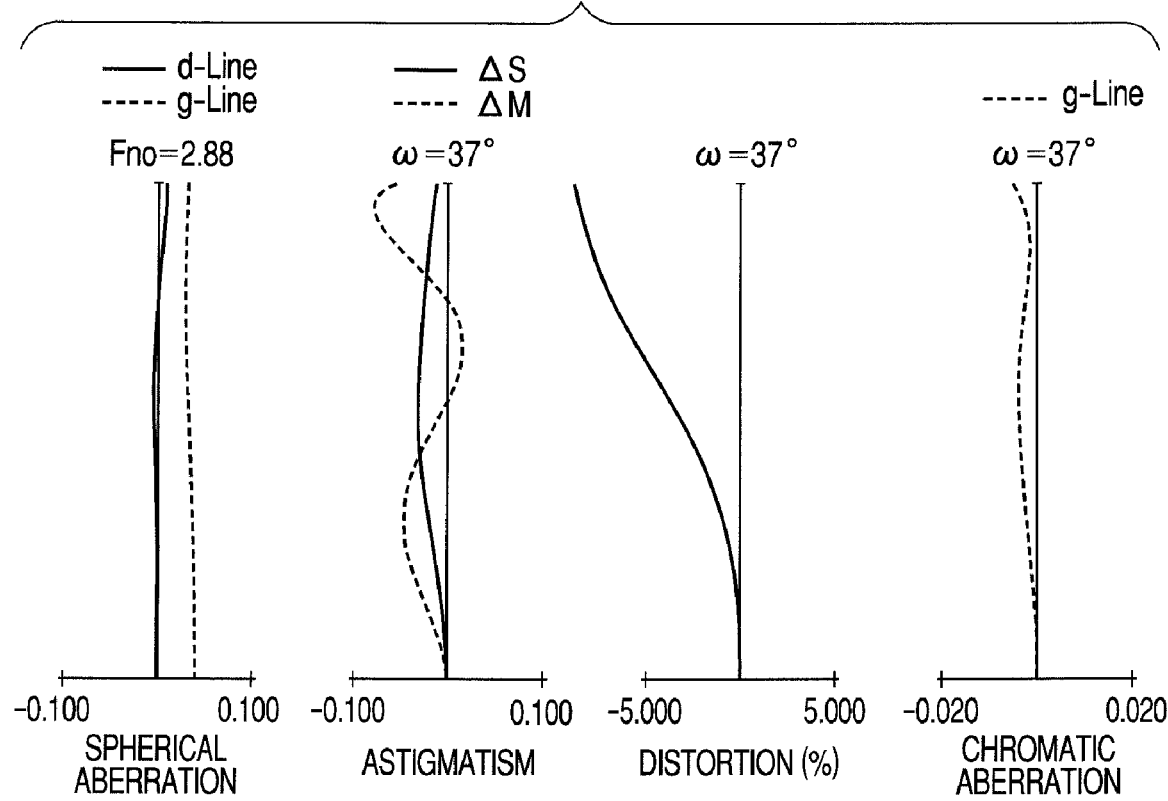
FIG. 10 is a diagram of aberrations at a wide-angle end in the third embodiment.
Figure 11:
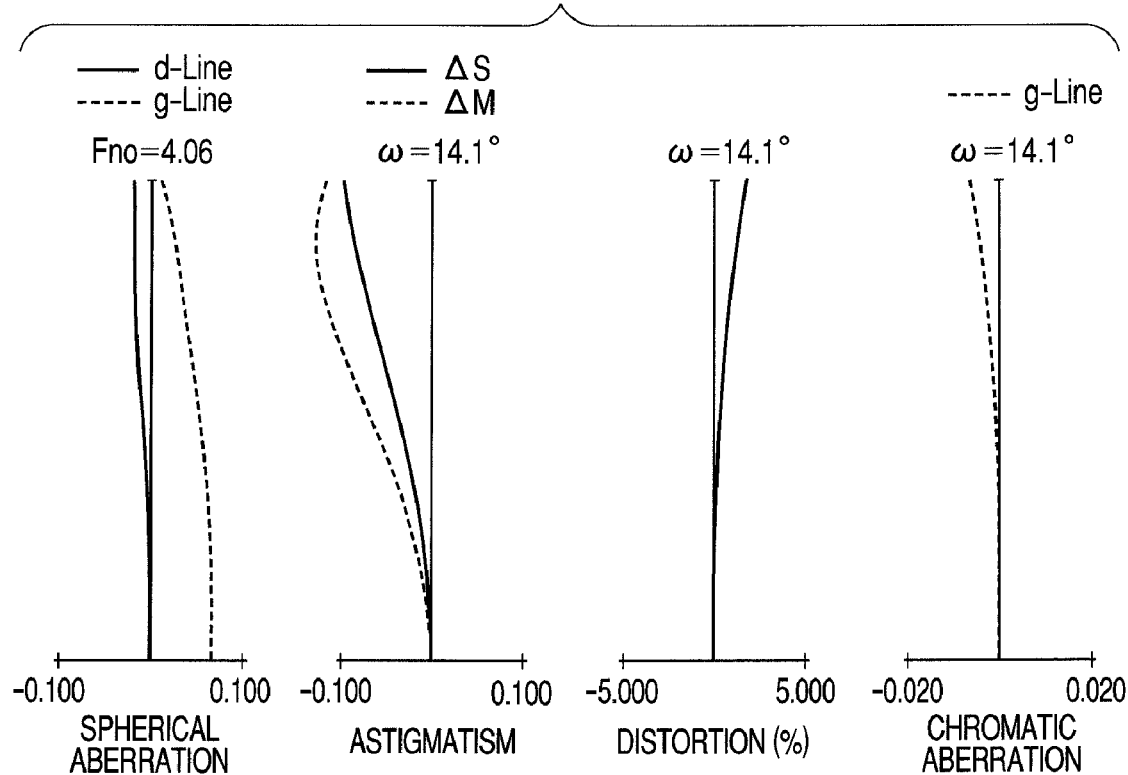
FIG. 11 is a diagram of aberrations in an intermediate zoom position in the third embodiment.
Figure 12:
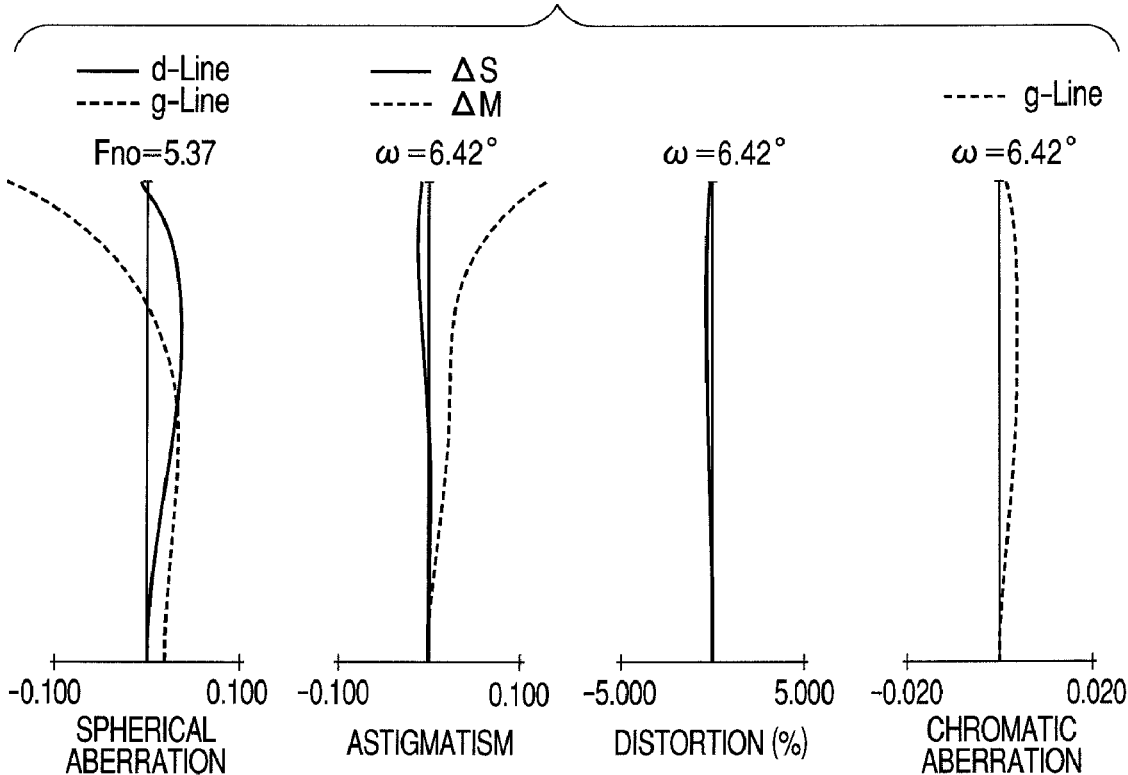
FIG. 12 is a diagram of aberrations at a telephoto end in the third embodiment.

FIG. 9 is a sectional view of a lens main part at a wide-angle end of a zoom lens system according to a third embodiment. FIGS. 10 to 12 are aberration diagrams at the wide-angle end, in an intermediate focal length, and at a telephoto end in the zoom lens system according to the third embodiment, respectively.

Figure 13:
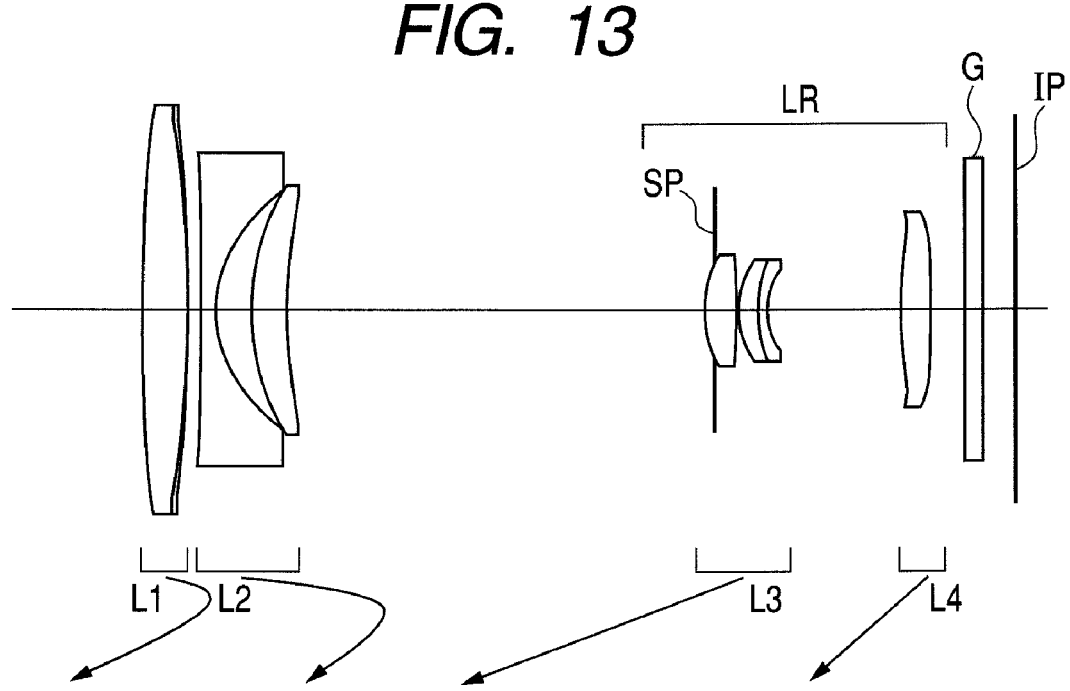
FIG. 13 is an optical sectional view in a fourth embodiment of the present invention.
Figure 14:
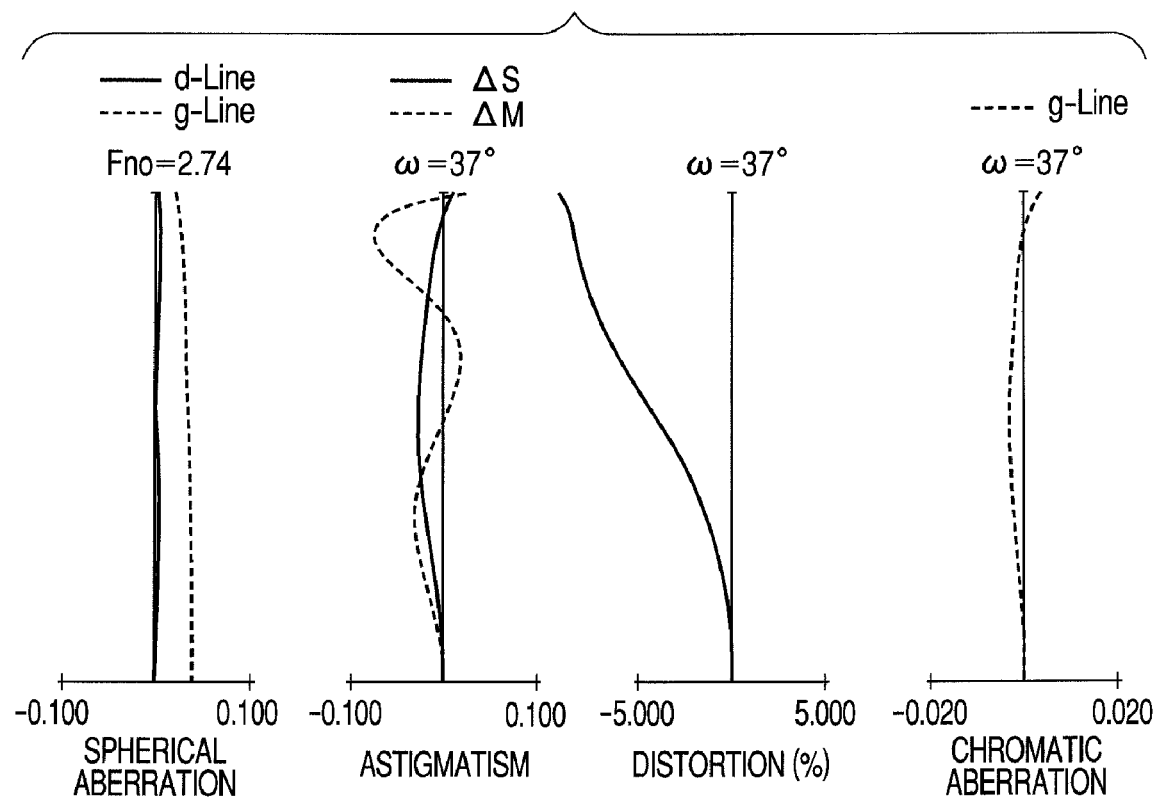
FIG. 14 is a diagram of aberrations at a wide-angle end in the fourth embodiment.
Figure 15:
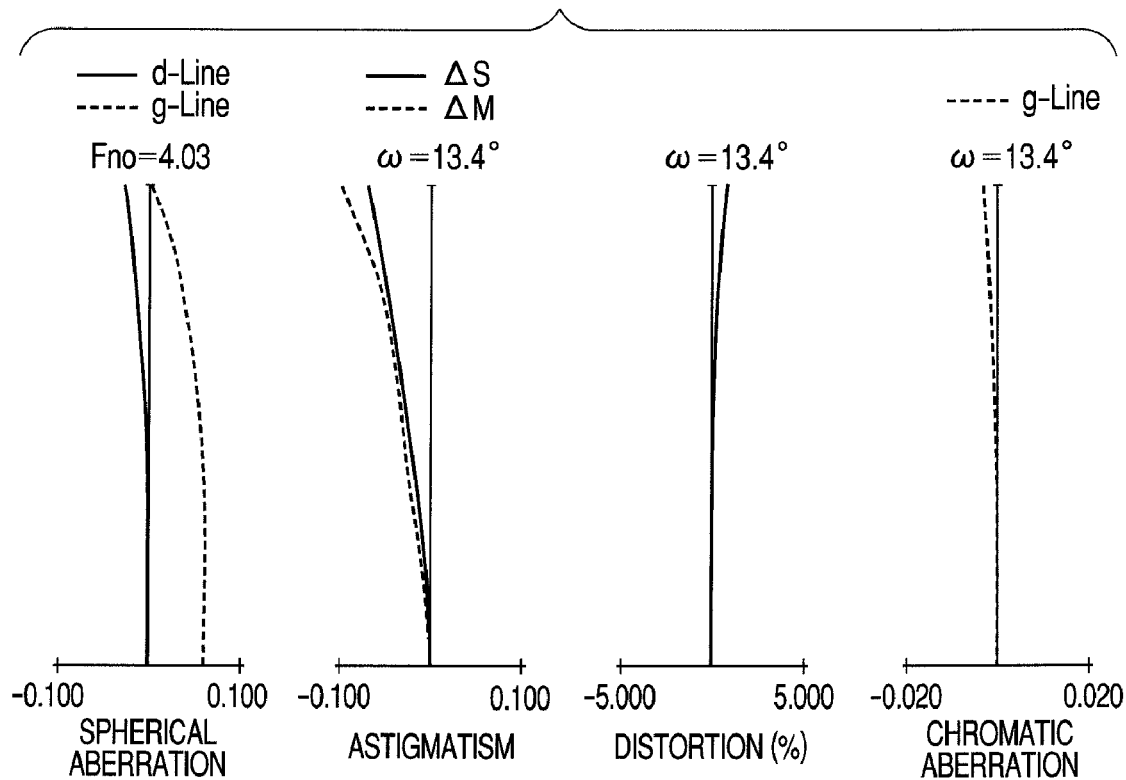
FIG. 15 is a diagram of aberrations in an intermediate zoom position in the fourth embodiment.
Figure 16:
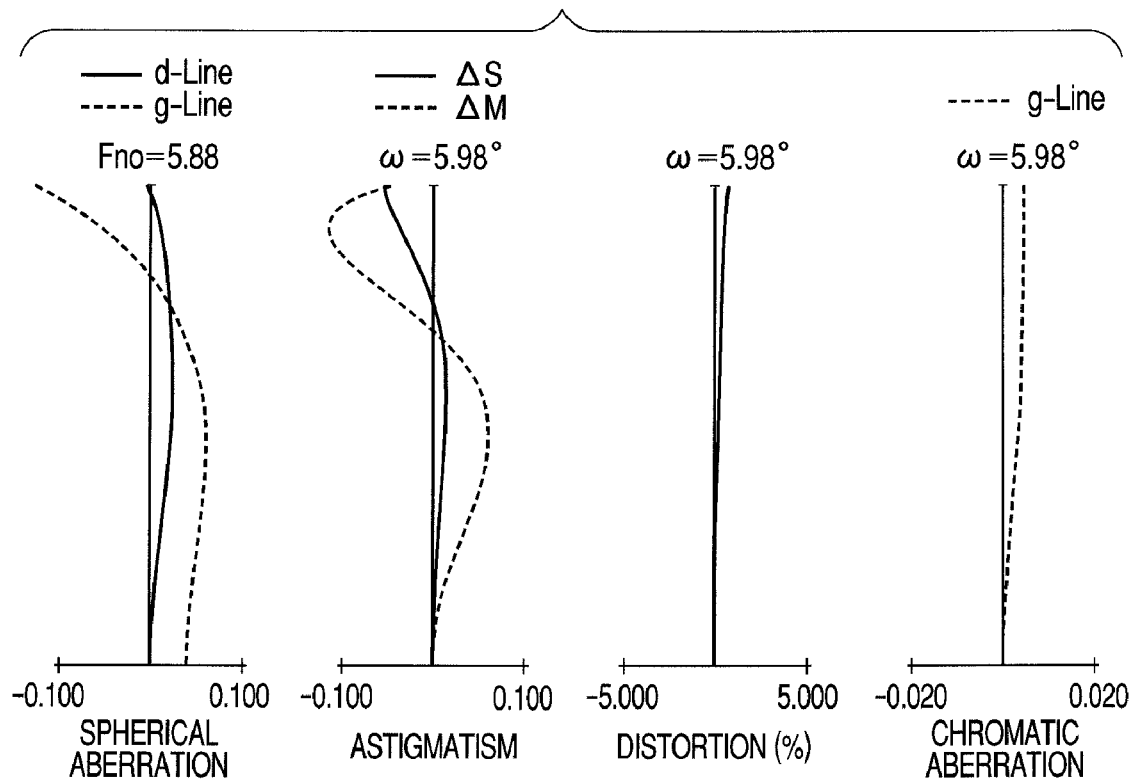
FIG. 16 is a diagram of aberrations at a telephoto end in the fourth embodiment.

FIG. 13 is a sectional view of a lens main part at a wide-angle end of a zoom lens system according to a forth embodiment. FIGS. 14 to 16 are aberration diagrams at the wide-angle end, in an intermediate focal length, and at a telephoto end in the zoom lens system according to the fourth embodiment, respectively.

Figure 17:
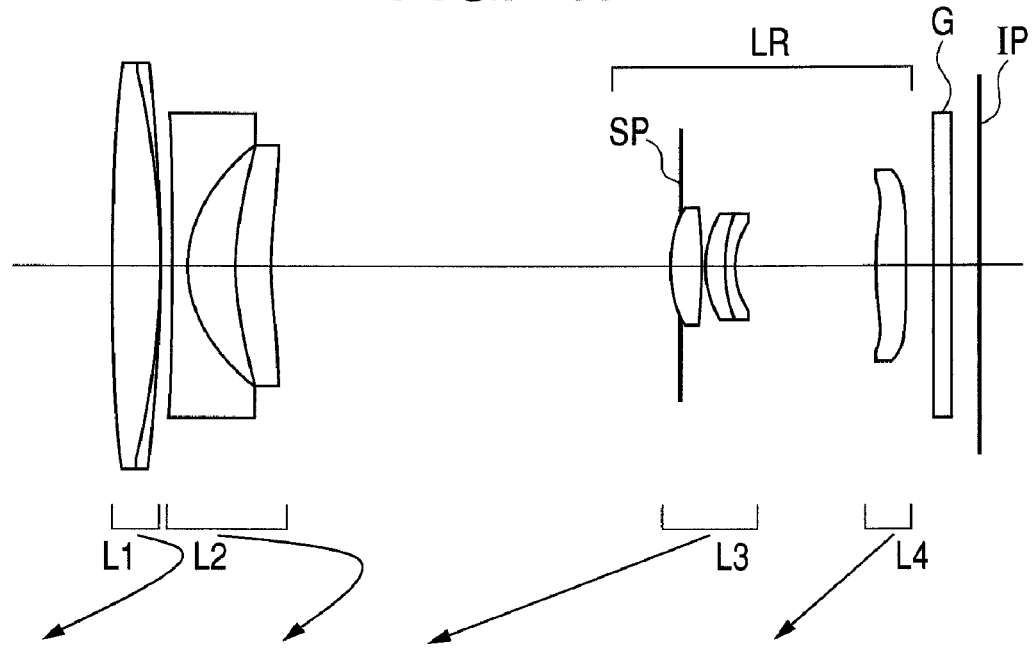
FIG. 17 is an optical sectional view in a fifth embodiment of the present invention.
Figure 18:
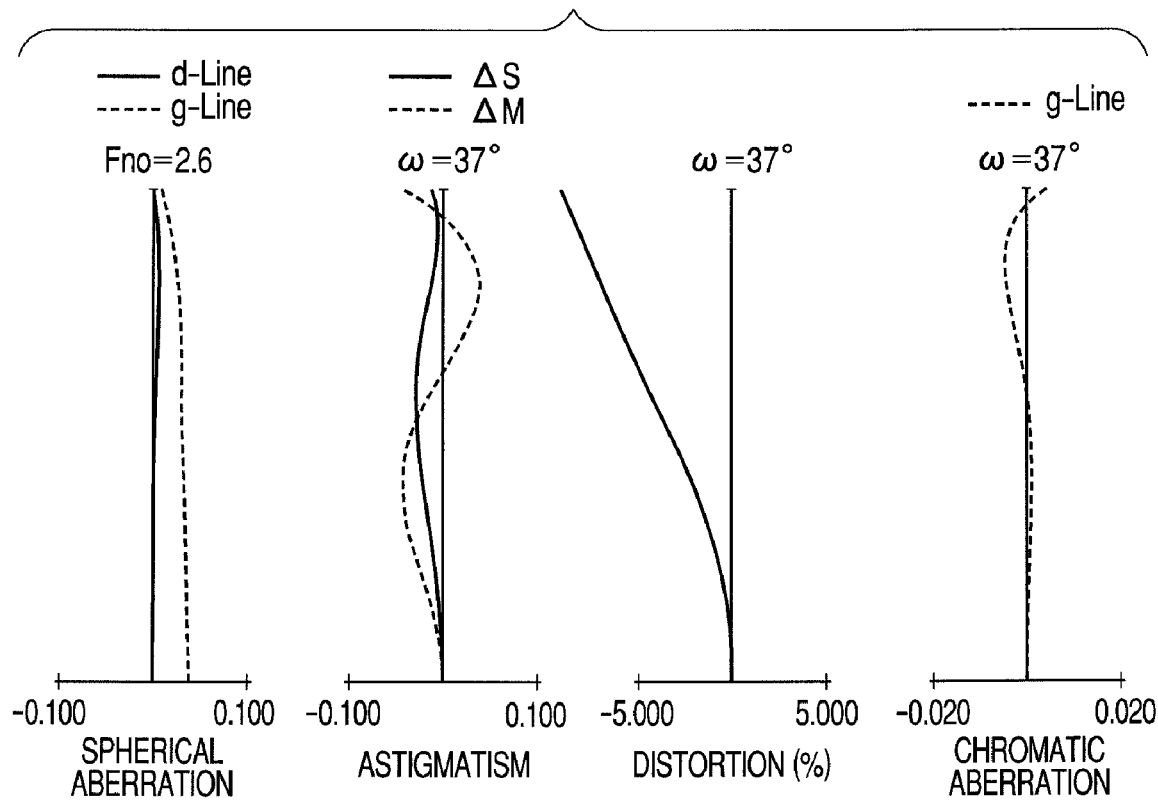
FIG. 18 is a diagram of aberrations at a wide-angle end in the fifth embodiment.
Figure 19:
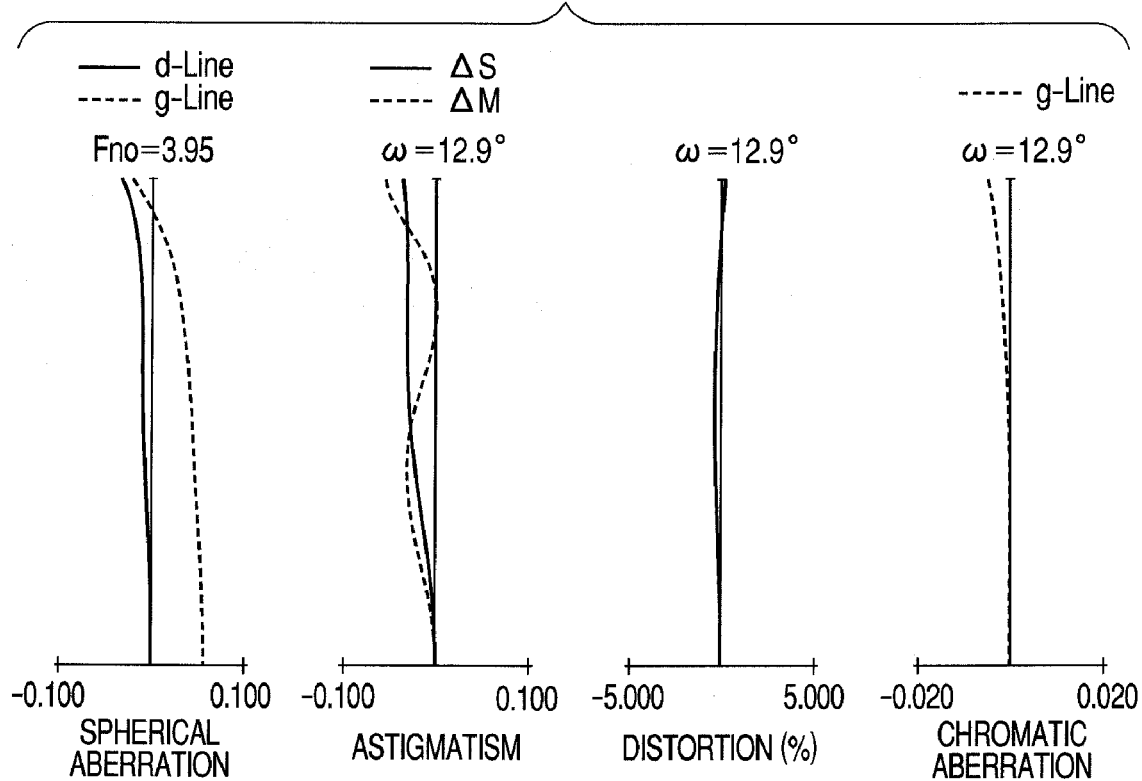
FIG. 19 is a diagram of aberrations in an intermediate zoom position in the fifth embodiment.
Figure 20:
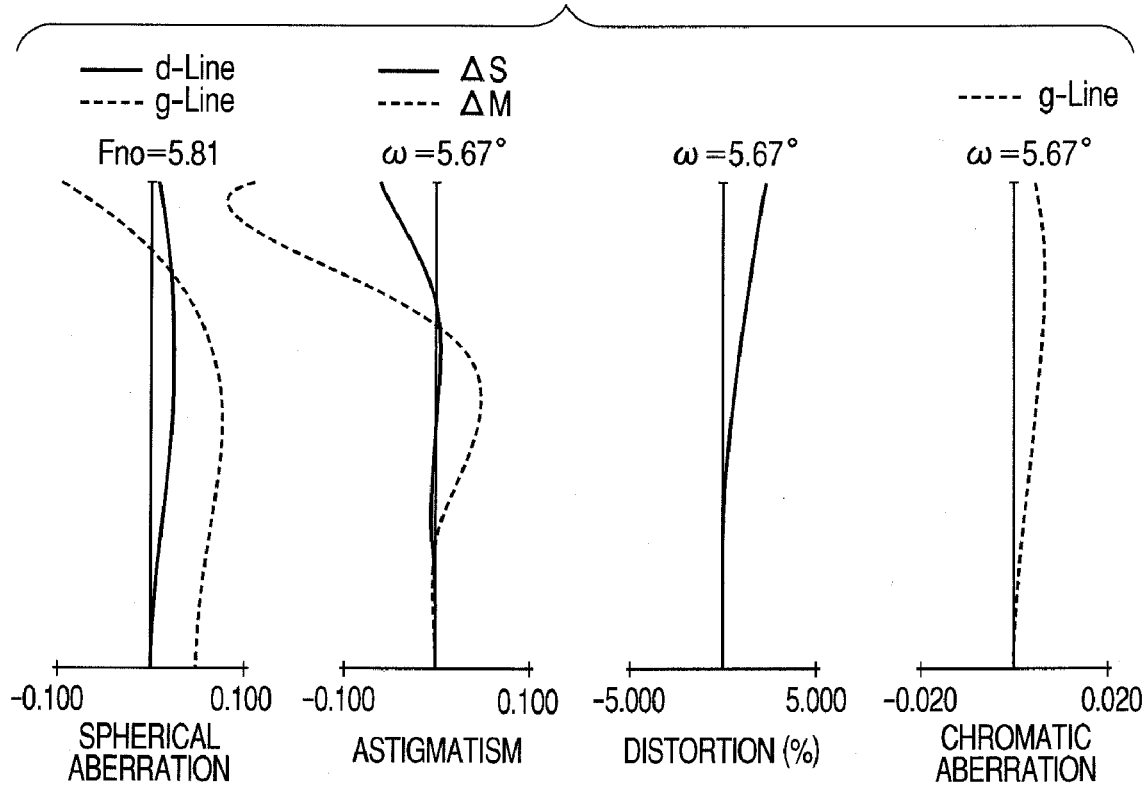
FIG. 20 is a diagram of aberrations at a telephoto end in the fifth embodiment.

FIG. 17 is a sectional view of a lens main part at a wide-angle end of a zoom lens system according to a fifth embodiment. FIGS. 18 to 20 are aberration diagrams at the wide-angle end, in an intermediate focal length, and at a telephoto end in the zoom lens system according to the fifth embodiment, respectively.

Figure 21:
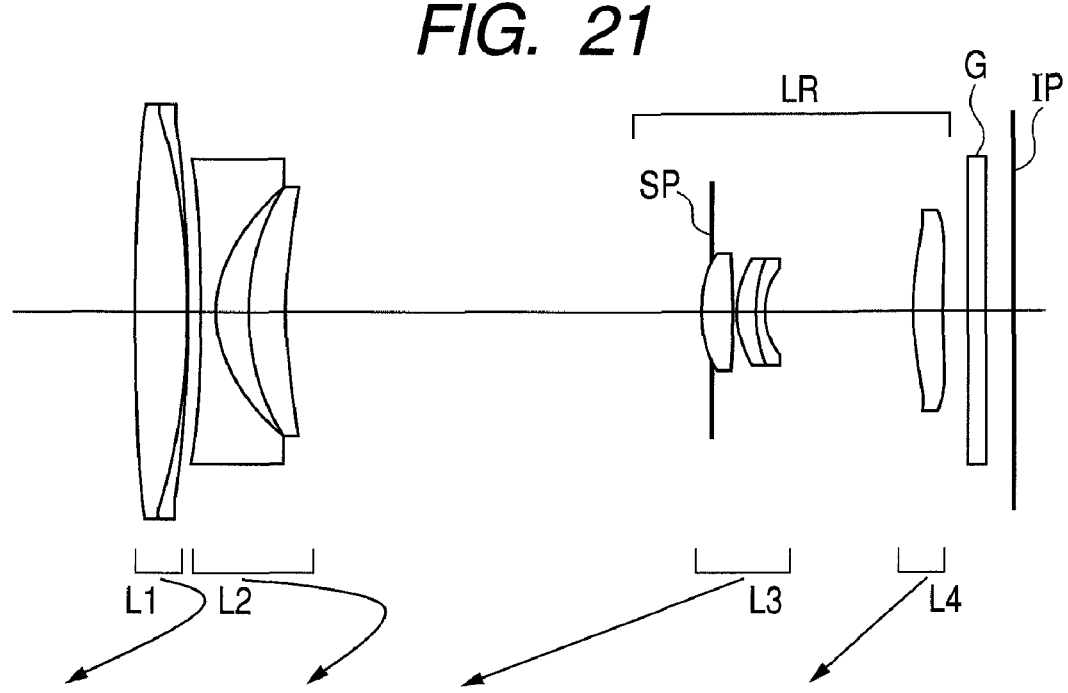
FIG. 21 is an optical sectional view in a sixth embodiment of the present invention.
Figure 22:
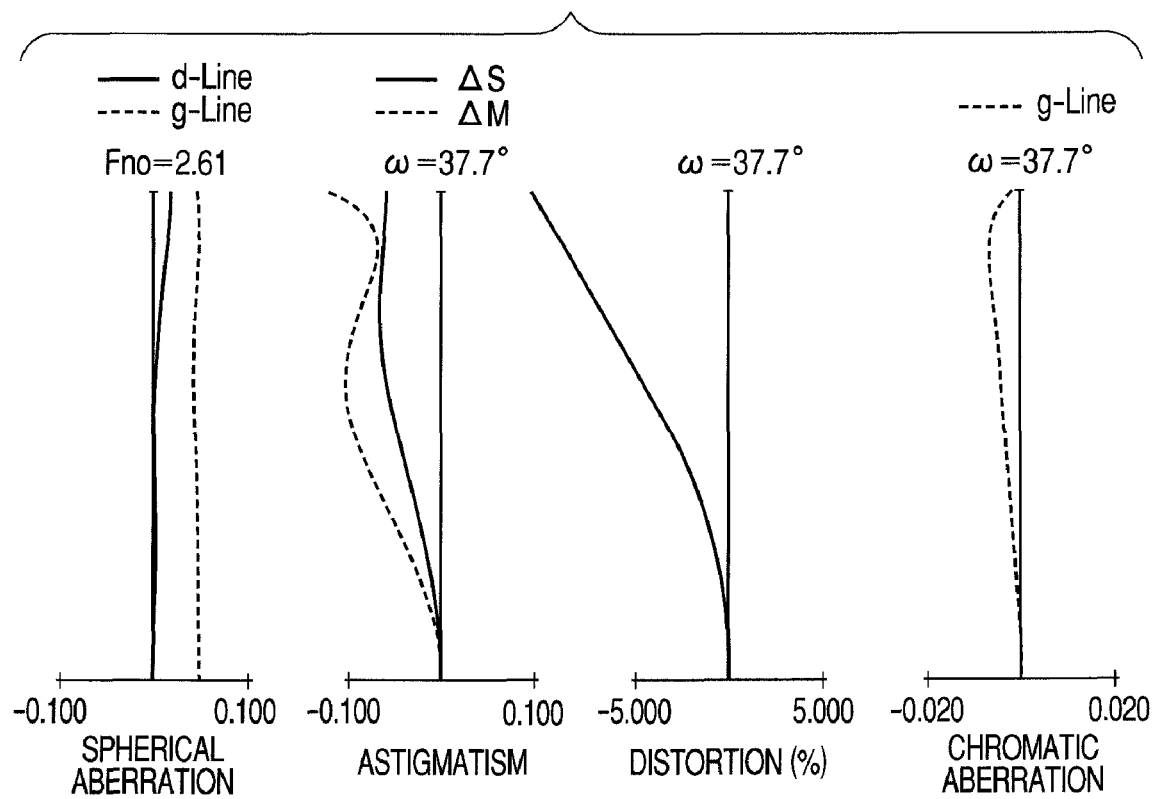
FIG. 22 is a diagram of aberrations at a wide-angle end in the sixth embodiment.
Figure 23:
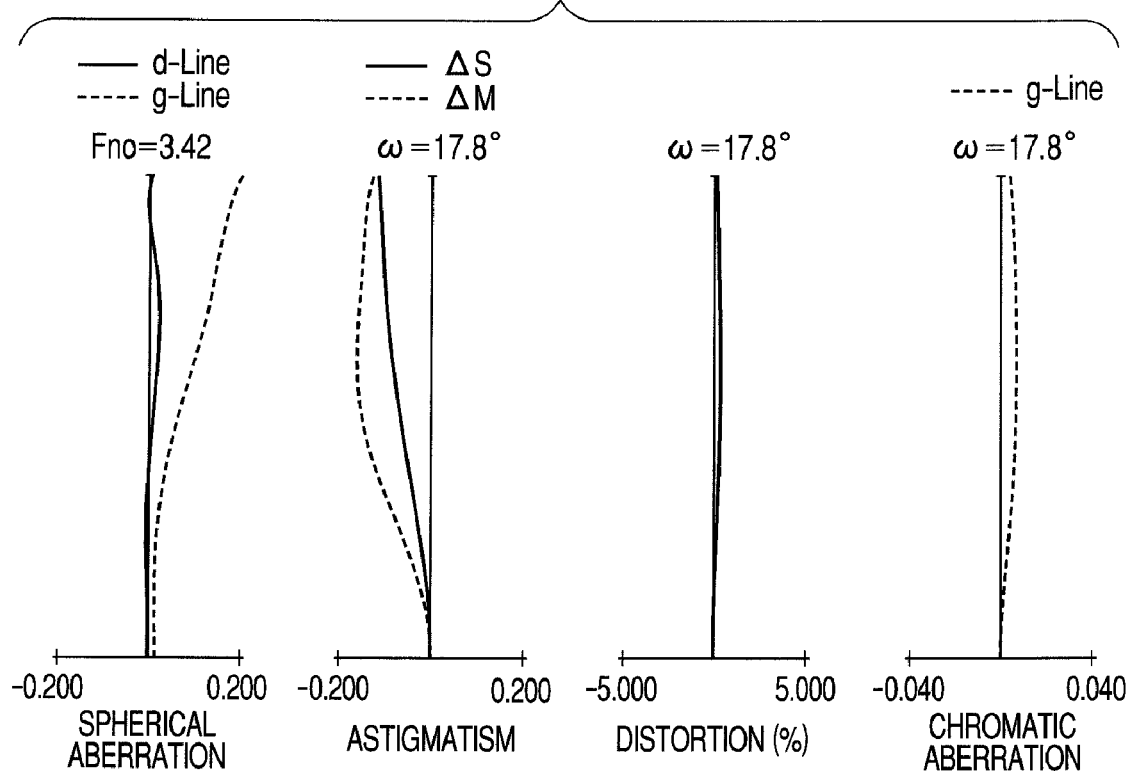
FIG. 23 is a diagram of aberrations in an intermediate zoom position in the sixth embodiment.
Figure 24:
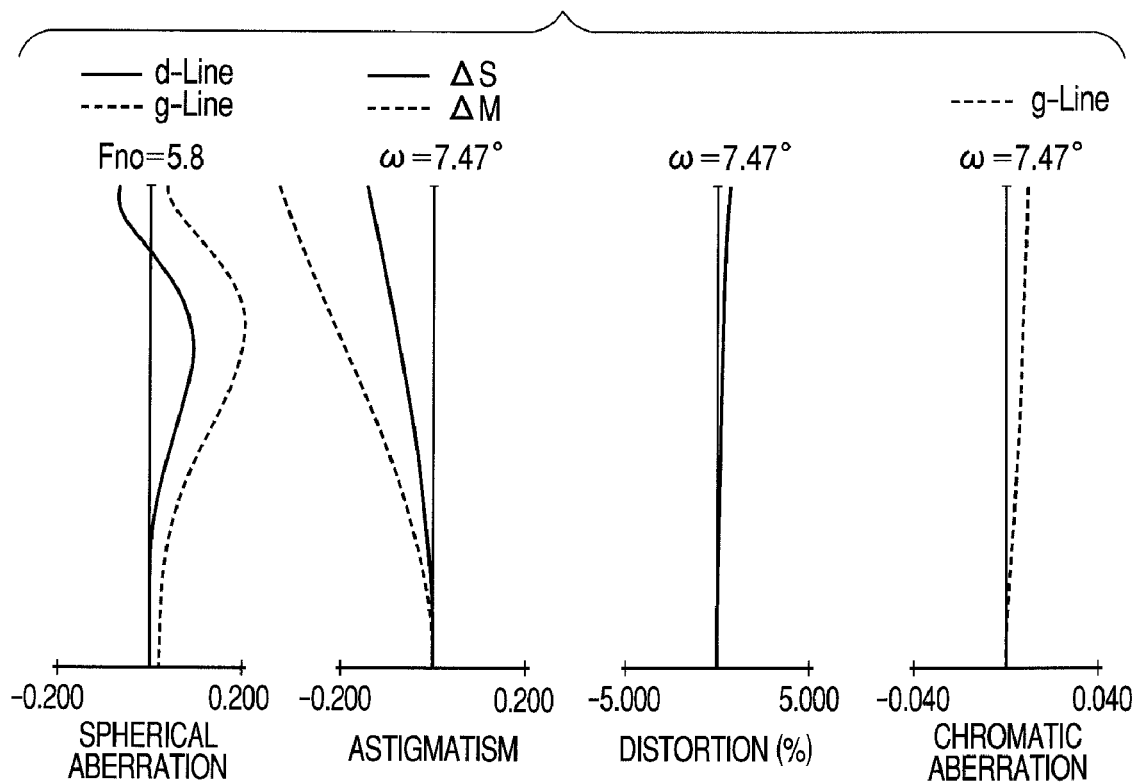
FIG. 24 is a diagram of aberrations at a telephoto end in the sixth embodiment.

FIG. 21 is a sectional view of a lens main part at a wide-angle end of a zoom lens system according to a sixth embodiment. FIGS. 22 to 24 are aberration diagrams at the wide-angle end, in an intermediate focal length, and at a telephoto end in the zoom lens system according to the sixth embodiment, respectively.

Figure 25:
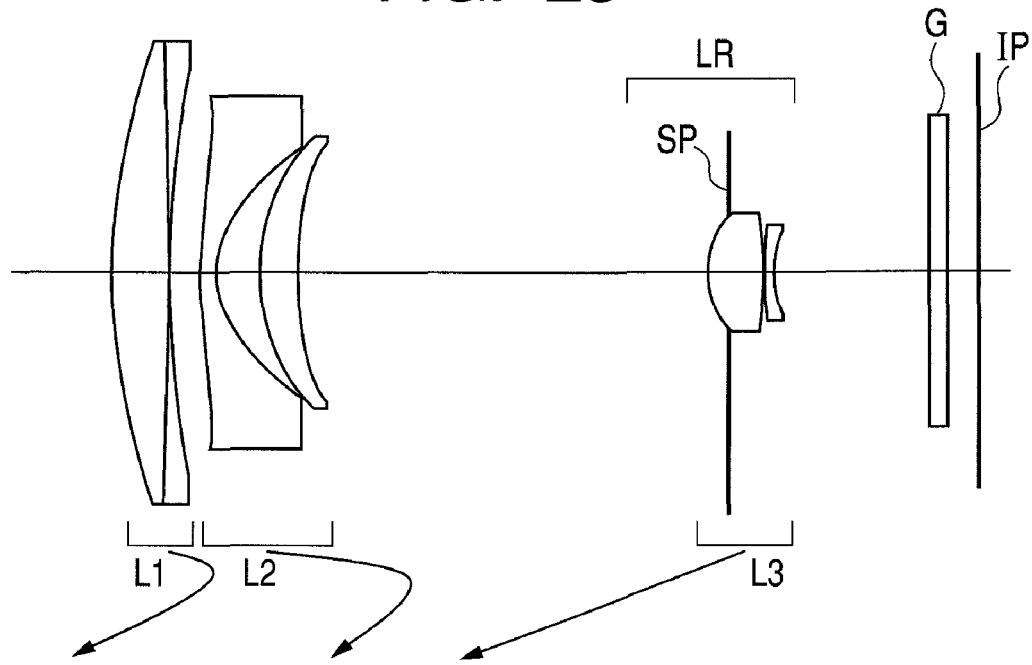
FIG. 25 is an optical sectional view in a seventh embodiment of the present invention.
Figure 26:
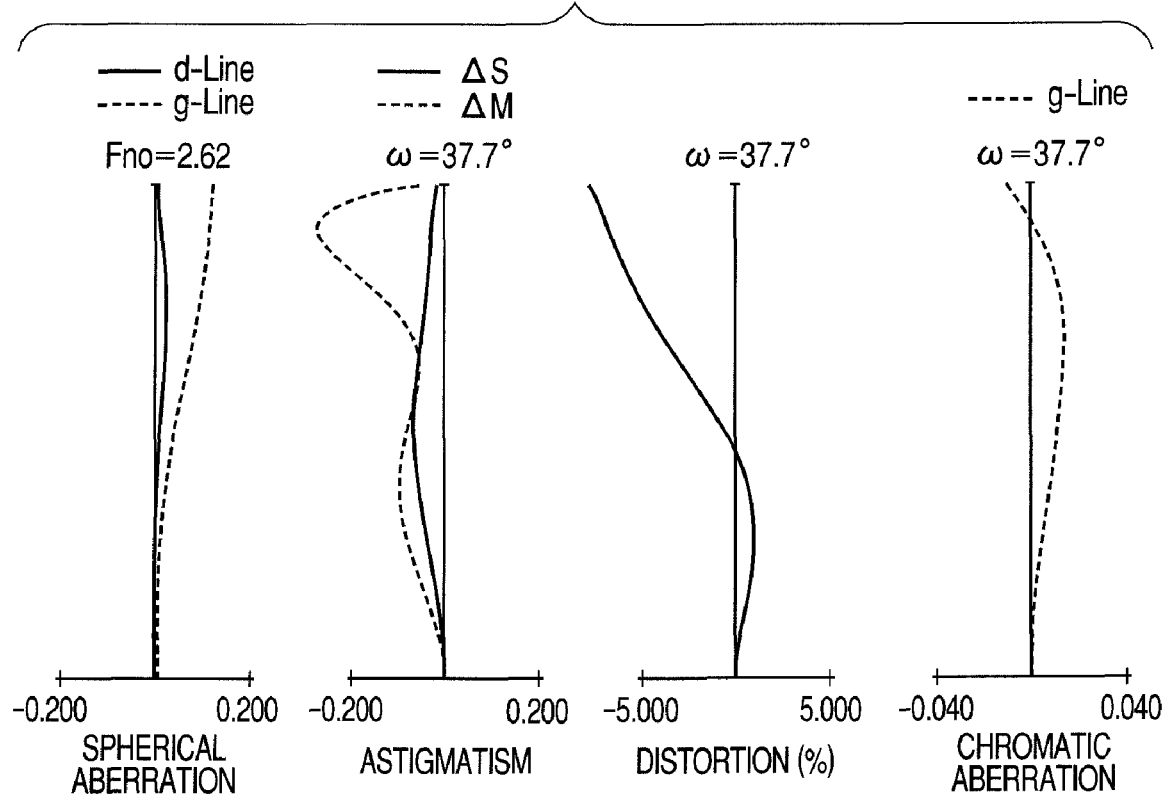
FIG. 26 is a diagram of aberrations at a wide-angle end in the seventh embodiment.
Figure 27:
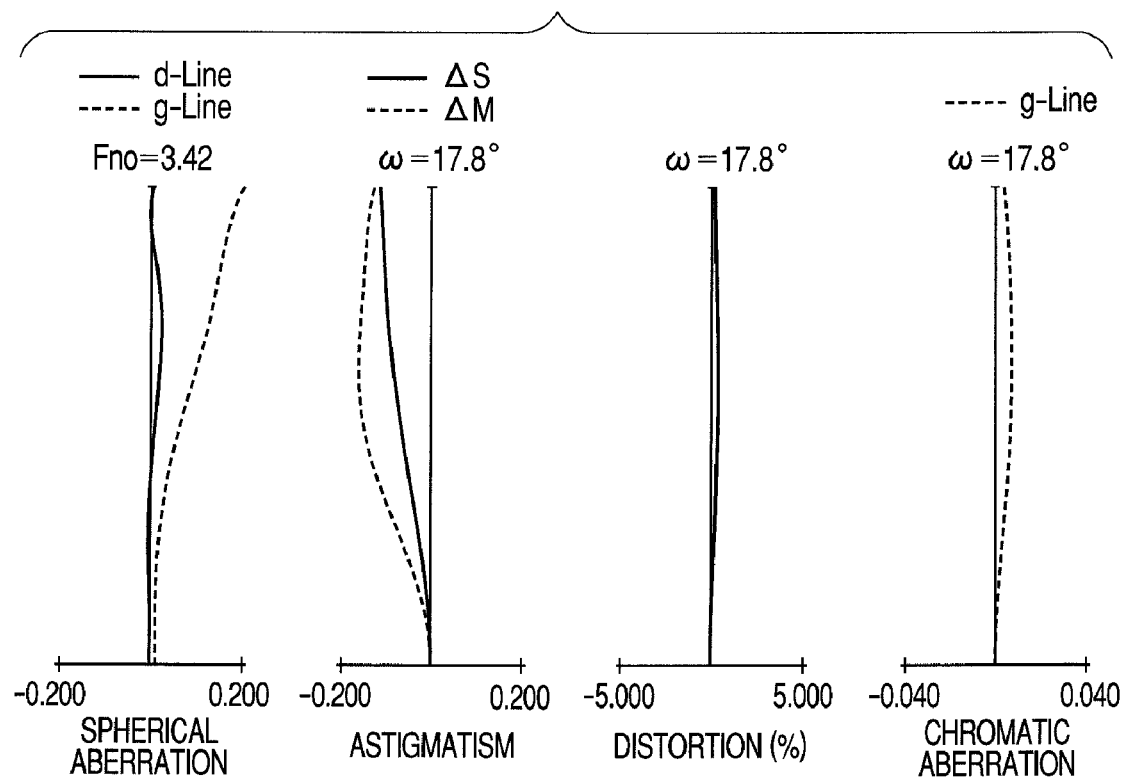
FIG. 27 is a diagram of aberrations in an intermediate zoom position in the seventh embodiment.
Figure 28:
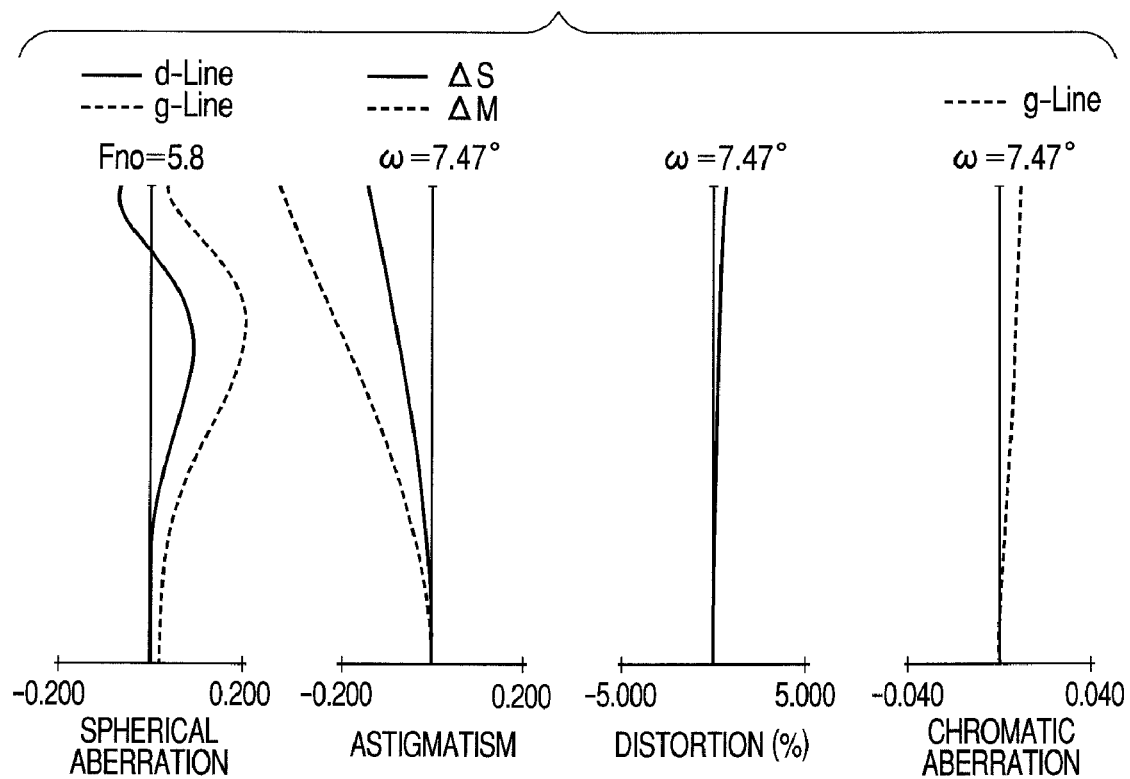
FIG. 28 is a diagram of aberrations at a telephoto end in the seventh embodiment.

FIG. 25 is a sectional view of a lens main part at a wide-angle end of a zoom lens system according to a seventh embodiment. FIGS. 26 to 28 are aberration diagrams at the wide-angle end, in an intermediate focal length, and at a telephoto end in the zoom lens system according to the seventh embodiment, respectively.

Figure 29:
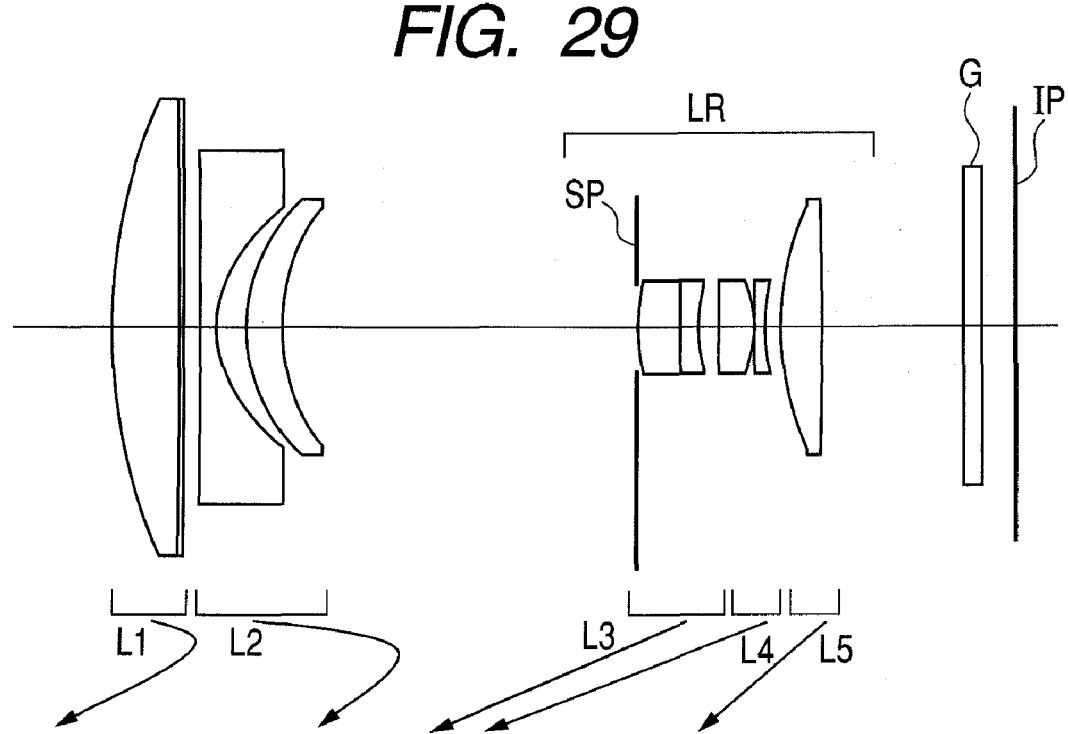
FIG. 29 is an optical sectional view in an eighth embodiment of the present invention.
Figure 30:
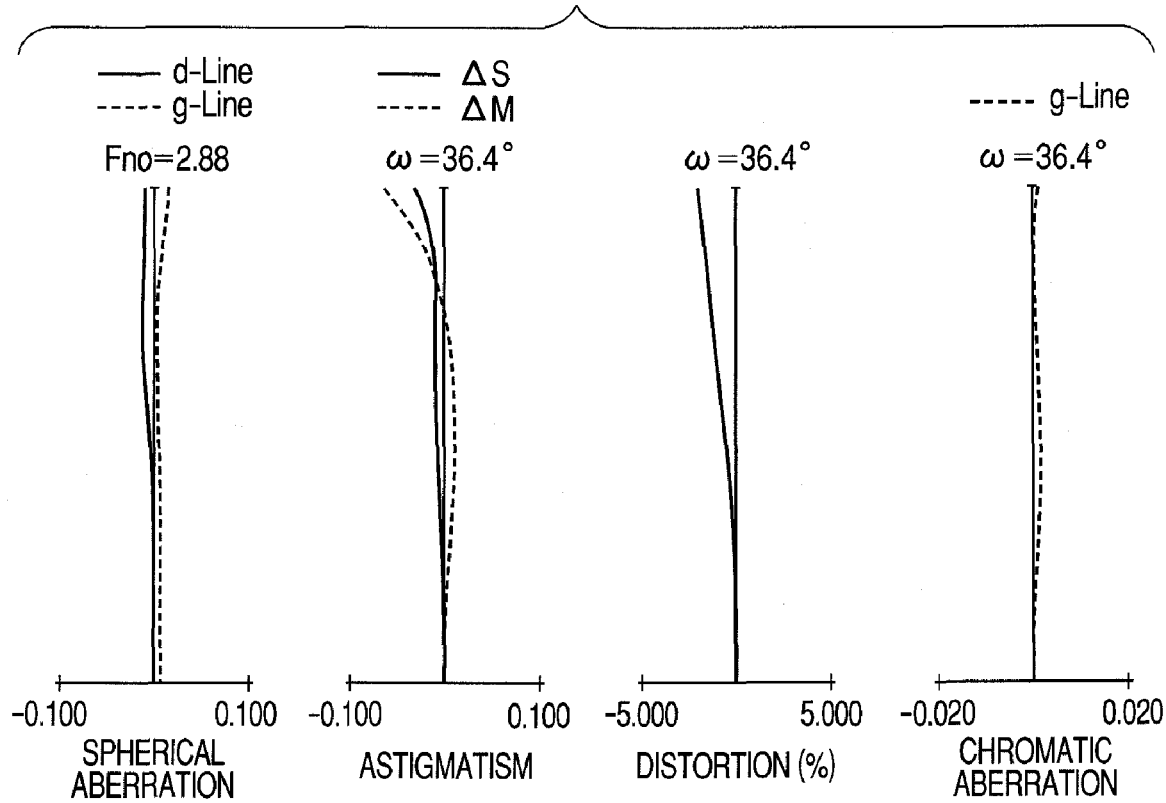
FIG. 30 is a diagram of aberrations at a wide-angle end in the eighth embodiment.
Figure 31:
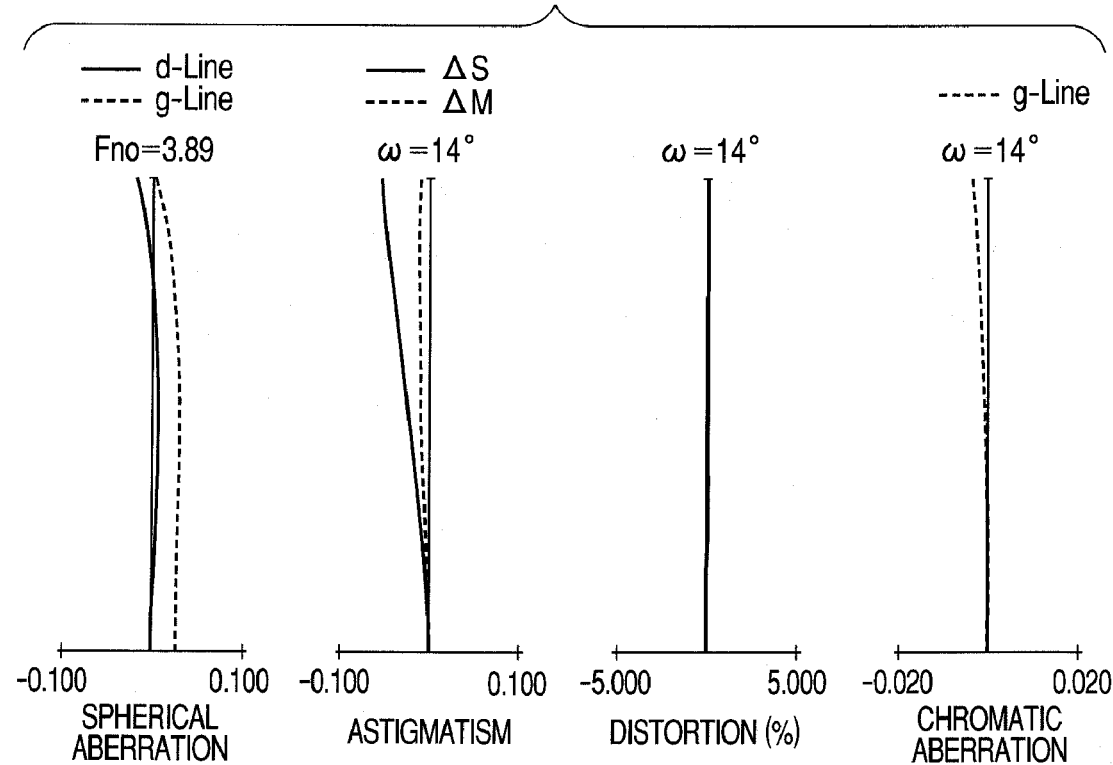
FIG. 31 is a diagram of aberrations in an intermediate zoom position in the eighth embodiment.
Figure 32:
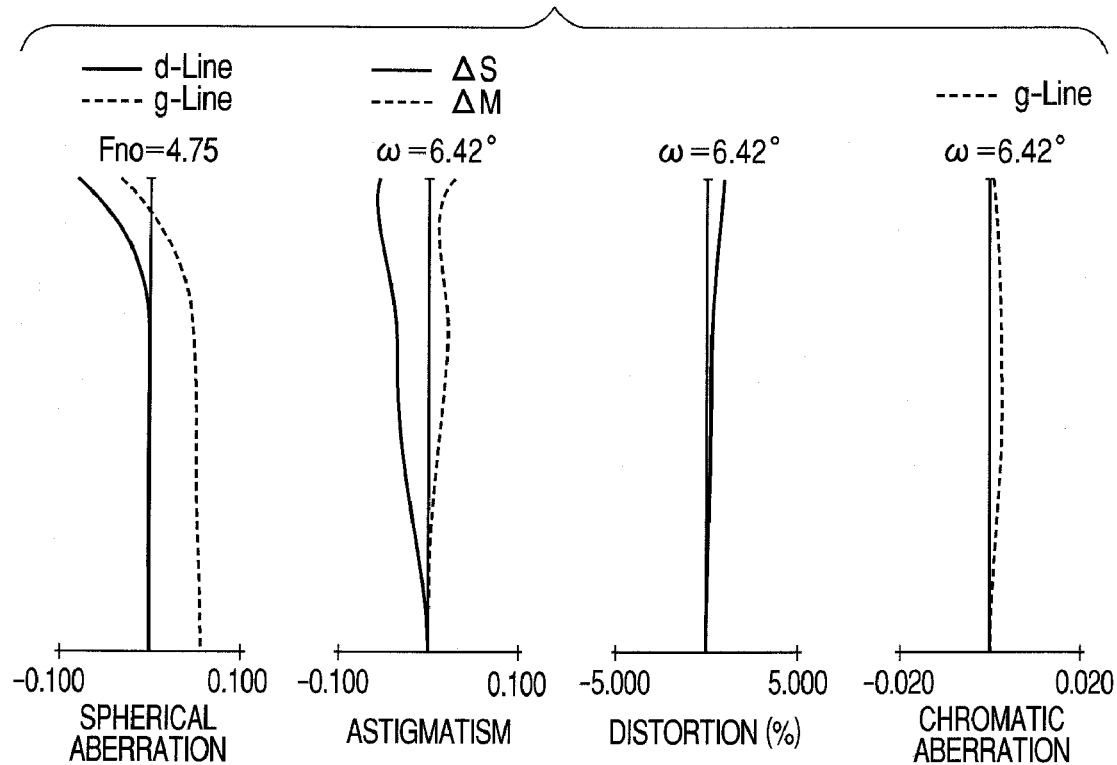
FIG. 32 is a diagram of aberrations at a telephoto end in the eighth embodiment.

FIG. 29 is a sectional view of a lens main part at a wide-angle end of a zoom lens system according to an eighth embodiment. FIGS. 30 to 32 are aberration diagrams at the wide-angle end, in an intermediate focal length, and at a telephoto end in the zoom lens system according to the eighth embodiment, respectively.

Figure 33:
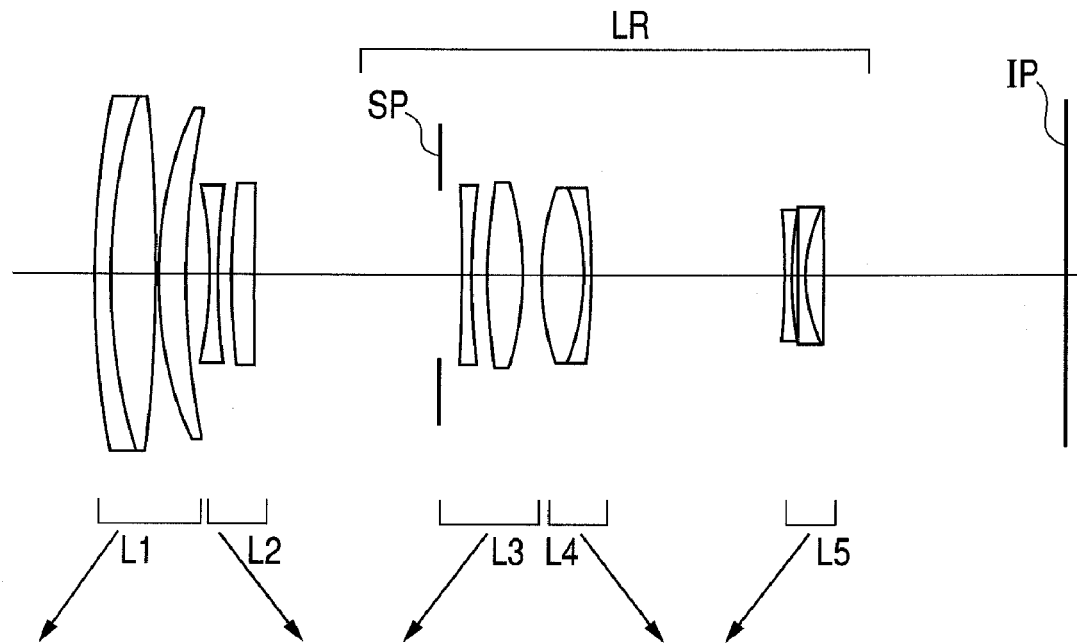
FIG. 33 is an optical sectional view in a ninth embodiment of the present invention.
Figure 34:
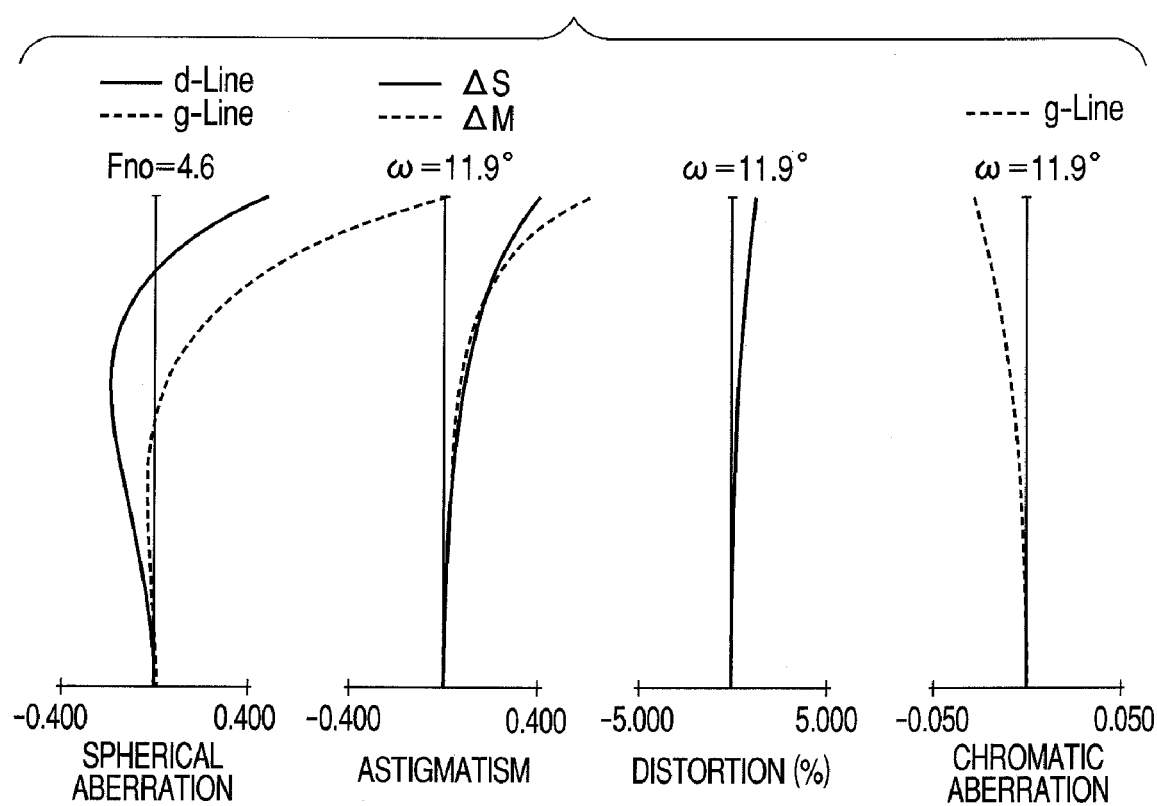
FIG. 34 is a diagram of aberrations at a wide-angle end in the ninth embodiment.
Figure 35:
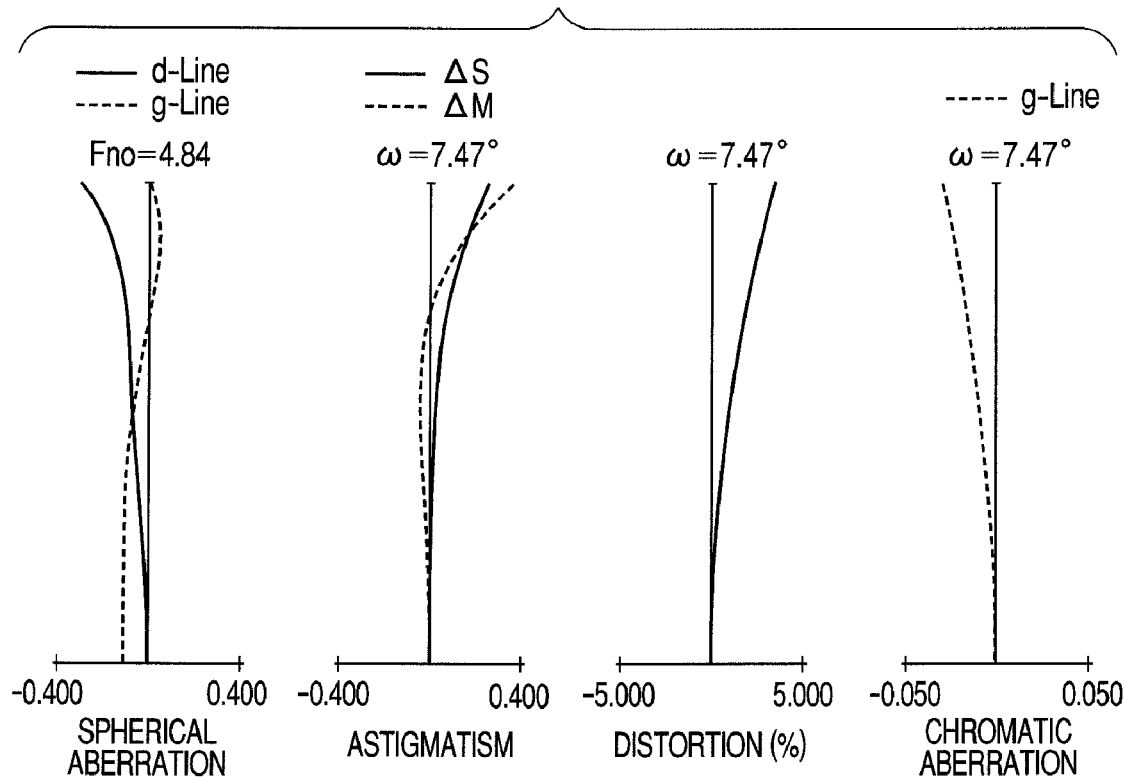
FIG. 35 is a diagram of aberrations in an intermediate zoom position in the ninth embodiment.
Figure 36:
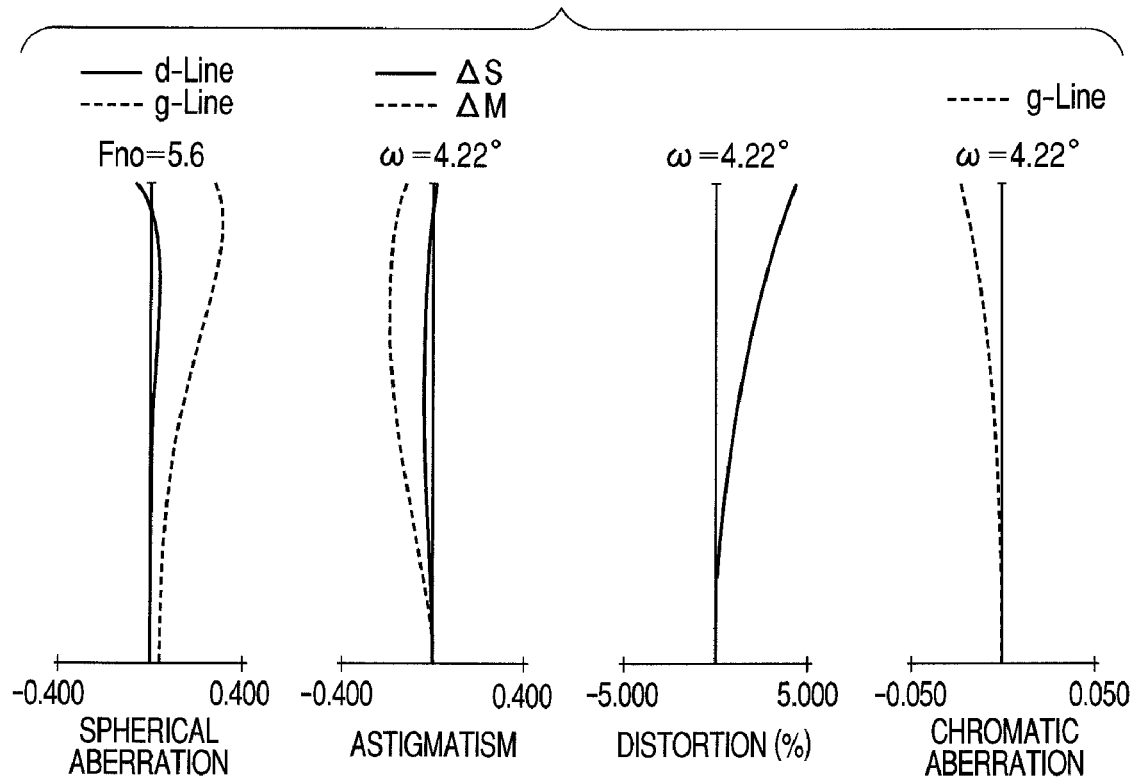
FIG. 36 is a diagram of aberrations at a telephoto end in the ninth embodiment.

FIG. 33 is a sectional view of a lens main part at a wide-angle end of a zoom lens system according to a ninth embodiment. FIGS. 34 to 36 are aberration diagrams at the wide-angle end, in an intermediate focal length, and at a telephoto end in the zoom lens system according to the ninth embodiment, respectively.

Figure 37:
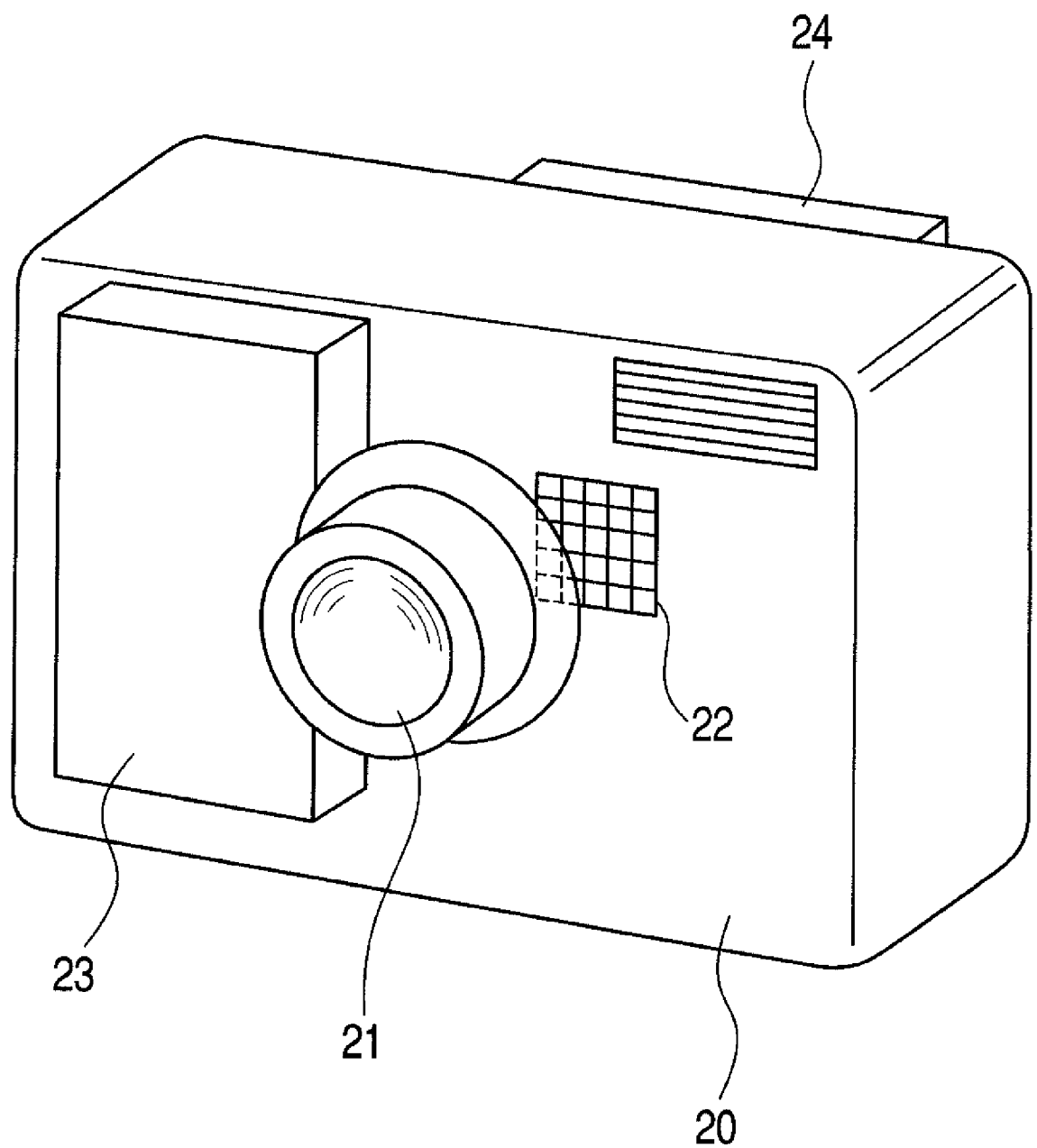
FIG. 37 is a schematic diagram of a main part of a camera of the present invention.

FIG. 37 is a schematic diagram of a main part of a camera including the zoom lens system according to the present invention.

The zoom lens system according to each of the embodiments is an image pickup lens system used in a camera such as a video camera or a digital camera. In each of the sectional views of the lenses, the left is an object side (front) and the right is an image side (rear).

When the zoom lens system according to each of the embodiments is used as a projection lens of a projector, the left is equivalent to a screen and the right is equivalent to an image to be projected.

In the lens sectional view, a first lens unit L1 having positive refractive power, a second lens unit L2 having negative refractive power, a third lens unit L3 having positive refractive power, a fourth lens unit L4 having positive refractive power, and a fifth lens unit L5 having positive refractive power are illustrated. Further, a rear unit LR including at least one lens unit is illustrated.

In the first to seventh embodiments, an aperture stop SP (F number determining stop) is arranged between an object side vertex of a lens arranged on a most object side and included in the third lens unit L3 and an intersection of a surface on the object side of the lens and an outer periphery of the lens.

In the eighth and ninth embodiments, the aperture stop SP is arranged on the object side of the third lens unit L3.

G denotes a glass block corresponding to an optical filter, a face plate, a quartz low-pass filter, an infrared cut filer, or the like.

IP denotes an image plane on which an image pickup surface of a solid-state image pickup element (photoelectric transducer) of a CCD sensor, a CMOS sensor, or the like is placed in an image pickup optical system of a video camera or a digital still camera.

The image plane is equivalent to a film surface in an image pickup optical system of a silver-halide film camera.

In the aberration diagrams, "d" and "g" represent d-line and g-line, respectively. ΔM and ΔS represent a meridional image plane and a sagittal image plane, respectively. A lateral chromatic aberration is represented by the g-line. Fno represents an F number and ω represents a half field angle.

In each of the following embodiments, the wide-angle end and the telephoto end refer to zoom positions where a lens unit for zooming is located at both ends of a movable range on an optical axis in terms of a mechanism.

Arrows indicate moving loci of the lens units during zooming from the wide-angle end to the telephoto end.

During zooming from the wide-angle end to the telephoto end, the first lens unit L1 moves to be located on the object side at the telephoto end compared with the wide-angle end.

The second lens unit L2 moves to increase an interval between the first lens unit L1 and the second lens unit L2.

The third lens unit L3 moves to decrease an interval between the second lens unit L2 and the third lens unit L3.

The zoom lens system according to each of the embodiments includes, in order from the object side to the image side, the first lens unit L1 having positive refractive power, the second lens unit L2 having negative refractive power, and the rear unit LR including at least one lens unit. Though the second lens unit L2 consists of two lenses, a small zoom lens system having a high zoom ratio and high optical performance is attained by using, for example, a material having a high refractive index made of translucent ceramics.

The second lens unit L2 consists of a negative biconcave lens component or a negative meniscus lens having a convex shape facing toward the object side and a positive meniscus lens element having a convex shape facing toward the object side. A material having a high refractive index is used for the negative lens component, whereby curvatures of lens surfaces are relaxed to reduce occurrence of aberrations such as coma and field curvature and a reduction in thickness of an optical element is realized.

At least one surface of the negative lens component of the second lens unit L2 is formed in an aspherical shape. When the surface on the object side has the aspherical shape, the surface is formed in a shape for intensifying negative refractive power toward off-axis, whereby negative field curvature in the off-axis position is corrected.

When the surface on the image plane side has the aspherical shape, the surface is formed in a shape in which negative optical power reduces toward off-axis in order to cancel the barrel-like distortion caused by the surface on the object side.

Besides being directly formed in a base material (lens), the aspherical surface may be formed by stacking a resin material (replica) on the base material.

On the other hand, for the positive meniscus lens element in the second lens unit L2 needs to be formed by a material more highly dispersed than the negative lens component in order to correct chromatic aberration in the second lens unit L2.

As described above, the optical glass tends to be more highly dispersed as a refractive index increases. Single crystals and polycrystals of ceramics and oxides are relatively low-dispersed even if the refractive index is high. Therefore, a reduction in size of the entire system is realized while chromatic aberration is corrected by using those materials.

In general, it is known that the optical glasses are distributed along several straight lines in a graph in which the ordinate indicates a refractive Abbe number to be larger upward and the abscissa indicates an Abbe number to be larger leftward (hereinafter referred to as "nd–vd chart"). In general, the optical glass has a characteristic that, when the refractive index increases, the Abbe number decreases and the dispersion increases.

On the other hand, among the single crystals and the polycrystals of ceramics and oxides having high light transmittance in a visible light range, there is known a material, a relation between a refractive index and an Abbe number of which is present in an area different from that of the normal optical glass in the nd–vd chart. In other words, there is known a material having a higher refractive index compared with an optical glass having an Abbe number same as that of the material.

In the present invention, such a material is used as a material of at least one of the positive lens element and the negative lens component of the second lens unit L2.

In the embodiments, the following conditions are satisfied:

$$2.45 < N2n - (9.3 \times 10^{-5} \times v2n^2 - 1.70 \times 10^{-2} \times v2n) < 3.00 \quad (1)$$

$$5 < v2n < 80 \quad (2)$$

$$1.98 < (N2n + N2p)/2 < 2.25 \quad (3)$$

where $N2n$ represent a refractive index of at least one material forming the negative lens component of the second lens unit L2 with respect to d-line and $v2n$ represents an Abbe number of the material, and $N2p$ represents a refractive index of a material forming the positive lens element of the second lens unit L2 with respect to d-line.

Note that the Abbe number is an Abbe number (vd) of a material with reference to d-line represented by the following expression.

$$vd = (Nd-1)/(NF-NC)$$

Nd: Refractive index with respect to d-line (wavelength: 587.6 nm)
NF: Refractive index with respect to F-line (wavelength: 486.1 nm)
NC: Refractive index with respect to C-line (wavelength: 656.3 nm)

Technical meanings of the conditional expressions are described below.

The conditional expression (1) specifies a relation between a refractive index with respect to d-line and an Abbe number of the material included in the negative lens component of the second lens unit L2. When the refractive index of the material included in the negative lens component decreases so that $N2n - (9.3 \times 10^{-5} \times v2n^2 - 1.70 \times 10^{-2} \times v2n)$ is smaller than the lower limit of the conditional expression (1), a movement amount of the second lens unit L2 increases in order to obtain a sufficient zoom ratio since the refractive power is small, whereby the lens system increases in size.

When the refractive index of the material included in the negative lens component increases so that $N2n - (9.3 \times 10^{-5} \times v2n^2 - 1.70 \times 10^{-2} \times v2n)$ exceeds an upper limit of the conditional expression (1), an effect of correcting a Petzval sum in a minus direction decreases and an image plane undesirably tilts to a negative side.

The conditional expression (2) specifies an Abbe number in d-line of the material included in the negative lens component of the second lens unit L2. When the Abbe number is smaller than the lower limit of the conditional expression (2), a more highly dispersed material cannot be selected as a material of the positive lens element in order to correct chromatic aberration in the second lens unit L2. In particular, it is difficult to correct lateral chromatic aberration at a wide-angle end. When the material included in the negative lens component is low-dispersed so that the Abbe number exceeds the upper limit of the conditional expression (2), the lateral chromatic aberration at the wide-angle end is undesirably excessively corrected.

The conditional expression (3) specifies an average refractive index of materials of the lenses forming the second lens unit L2. When the average refractive index is smaller than the lower limit of the conditional expression (3), curvatures of lens surfaces of the negative lens component and the positive lens element decrease, and high-order aberration occurs on the lens surfaces, whereby optical performance is deteriorated.

Further, the thickness of each of the lenses increases and the length on an optical axis of the entire second lens unit L2 increases. When the average refractive index increases to exceed the upper limit of the conditional expression (3), the effect of correcting a Petzval sum in a minus direction decreases and an image plane characteristic undesirably tilts to the negative side.

Numerical value ranges of the conditional expressions (2) and (3) are further desirably set as follows:

$$30 < v2n < 55 \quad (2a)$$

$$2.00 < (N2n + N2p)/2 < 2.20 \quad (3a)$$

By configuring the components as described above, in the embodiments, the second lens unit can be formed by a small number of lenses while the second lens unit has a high zoom ratio and high optical performance. Consequently, a reduction in size of the zoom lens system is attained.

By satisfying the conditions described above, the zoom lens system having a high zoom ratio and high optical performance over the entire zoom range is obtained.

In the embodiments, in order to perform more satisfactory aberration correction and realize a reduction in size of the entire lens system while reducing aberration fluctuation during zooming, one or more of conditions described below are desirably satisfied.

The following condition is desirably satisfied:

$$0.05 < D2/fw < 1.2 \quad (4)$$

where D2 represents a distance from a surface on a most object side to a surface on a most image side of the second lens unit L2 and fw represents a focal length of the zoom lens system at the wide-angle end.

The conditional expression (4) specifies the thickness on the optical axis of the second lens unit L2. When the thickness of the second lens unit L2 reduces so that D2/fw is smaller than the lower limit of the conditional expression (4), the negative lens component and the positive lens element interfere with each other. Therefore, it is difficult to give a curvature of predetermined refractive power to the lens surfaces and satisfactorily perform aberration correction.

In particular, lateral chromatic aberration and field curvature at the wide-angle end and coma at the telephoto end are insufficiently corrected. When the thickness of the second lens unit L2 increases so that D2/fw is larger than the upper limit of the conditional expression (4), the second lens unit L2 is too thick. Therefore, it is difficult to reduce the retracted length when a retracting system is used.

The following condition is desirably satisfied:

$$1.98 < v2n/v2p < 3.2 \quad (5)$$

where $\mu 2P$ represents an Abbe number of the material forming the positive lens element of the second lens unit L2.

The conditional expression (5) specifies a relation between Abbe numbers of the material included in the negative lens component and the material forming the positive lens element of the second lens unit L2. When a ratio of the Abbe numbers is smaller than the lower limit of the conditional expression (5), lateral chromatic aberration at the wide-angle end is insufficiently corrected. Therefore, correcting the lateral chromatic aberration causes the thickness of the second lens unit L2 to increase. When the ratio of the Abbe numbers is larger than the upper limit of the conditional expression (5), lateral chromatic aberration at the wide-angle end is excessively corrected.

The following condition is desirably satisfied:

$$-0.4 < f2n/f2p < -0.2 \quad (6)$$

where f2n and f2p represent the focal lengths of the negative lens component and the positive lens element of the second lens unit L2, respectively.

The conditional expression (6) specifies a ratio of refractive powers (inverses of the focal lengths) of the negative lens component and the positive lens element of the second lens unit L2. When an absolute value of the focal length of the negative lens component becomes longer with respect to the focal length of the positive lens element so that f2n/f2p is smaller than the lower limit of the conditional expression (6), a front lens diameter (first lens unit L1) increases. Therefore, it is difficult to reduce the size of the entire system. When the absolute value of the focal length of the negative lens component becomes shorter with respect to the focal length of the positive lens element so that f2n/f2p is larger than the upper limit of the conditional expression (6), aberrations that occur off-axis at the wide-angle end increase. Therefore, in particular, it is difficult to correct lateral chromatic aberration and distortion at the wide-angle end.

The following condition is desirably satisfied:

$$2.8 < ft/fw < 10 \quad (7)$$

where ft represents the focal length of the zoom lens system at the telephoto end.

The conditional expression (7) relates to a zoom ratio of the entire system. The conditional expression (7) clarifies zoom ranges in the embodiments and designates a range in which a high zoom ratio, high optical performance, and a reduction in size of the entire system can be most effectively attained when a predetermined material is used. The zoom ratio depends on refractive powers of the lens units arranged for magnification, a moving range during zooming, and the like.

The following conditions are desirably satisfied:

$$1.5 < |\beta 2t/\beta 2w| < 3.2 \quad (8)$$

$$0.3 < |\beta 3t/\beta 3w| < 7.1 \quad (9)$$

where β2w and β2t represent lateral magnifications of the second lens unit L2 at the wide-angle end and at the telephoto end, respectively, and β3w and β3t represent lateral magnifications of the third lens unit L3 included in the rear unit LR at the wide-angle end and at the telephoto end, respectively.

The conditional expressions (8) and (9) specify a range of an appropriate zooming action of the second lens unit L2 and the third lens unit L3. When |β2t/β2w| is smaller than the lower limit of the conditional expression (8) or |β3t/β3w| is larger than the upper limit of the conditional expression (9), a zooming action of the third lens unit L3 is so strong that it becomes difficult to correct aberrations and sensitivity during manufacturing undesirably increases when attempting to obtain a high zoom ratio.

When |β2t/β2w| is larger than the upper limit of the conditional expression (8) or |β3t/β3w| is smaller than the lower limit of the conditional expression (9), when attempting to obtain a high zoom ratio, a zooming action of the second lens unit L2 becomes so strong that it is difficult to correct aberrations and sensitivity during manufacturing is undesirably high. When large sharing of magnification is given to the third lens unit L3, the second lens unit L2 moves along a locus convex to the image side during zooming.

Compared with a case in which the second lens unit L2 moves linearly to the image side, it is less necessary to secure a moving interval to the image side of the second lens unit L2. Therefore, it is possible to arrange a position of the second lens unit L2 at the wide-angle end closer to the aperture stop SP. As a result, it is easy to reduce the front lens diameter.

The following condition is desirably satisfied:

$$-2.5 < f2/fw < -0.5 \quad (10)$$

where f2 represents the focal length of the second lens unit L2.

The conditional expression (10) specifies a ratio of the focal length of the second lens unit L2 to the focal length of the entire system at the wide-angle end. When the refractive power of the second lens unit L2 decreases so that f2/fw is smaller than the lower limit of the conditional expression (10), a movement amount of the second lens unit L2 increases in order to obtain a sufficient zoom ratio and the entire system increases in size. When the refractive power of the second lens unit L2 increases so that f2/fw is larger than the upper limit of the conditional expression (10), it becomes difficult to correct coma at the telephoto end. Further, a thickness deviation ratio of the negative lens in the second lens unit L2 increases. Therefore, it is difficult to manufacture the second lens unit L2. The thickness of each of the lenses increases because a curvature of each of the lens surfaces is sharp, and hence the thickness of the entire second lens unit L2 increases.

The following condition is desirably satisfied:

$$-6.8 < f1/f2 < -1.7 \quad (11)$$

where f1 represents the focal length of the first lens unit L1.

The conditional expression (11) specifies a ratio of the focal lengths of the first lens unit L1 and the second lens unit L2. When the ratio is smaller than the lower limit of the conditional expression (11), an F number at the telephoto end undesirably increases. When the ratio is larger than the upper limit of the conditional expression (11), the front lens diameter increases and the entire system undesirably increases in size.

Numerical value ranges of the conditional expressions (4) to (11) are more desirably set as follows:

$$0.78 < D2/fw < 1.10 \quad (4a)$$

$$2.0 < v2n/v2p < 3.15 \quad (5a)$$

$$-0.39 < f2n/f2p < -0.22 \quad (6a)$$

$$5.8 < ft/fw < 9 \quad (7a)$$

$$1.6 < |\beta 2t/\beta 2w| < 2.1 \quad (8a)$$

$$4.3 < |\beta 3t/\beta 3w| < 7.1 \quad (9a)$$

$$-2.2 < f2/fw < -1.6 \quad (10a)$$

$$-6.1 < f1/f2 < -4.5 \quad (11a)$$

Next, lens configurations of the zoom lens systems according to the embodiments are described below.

In the first embodiment illustrated in FIG. 1, the zoom lens system includes, in order from the object side to the image side, the first lens unit L1 having positive refractive power, the second lens unit L2 having negative refractive power, the third lens unit L3 having positive refractive power, and the fourth lens unit L4 having positive refractive power.

During zooming from the wide-angle end to the telephoto end, the first lens unit L1 moves along a locus convex to the image side and the second lens unit L2 moves along a locus convex to the image side. During zooming from the wide-angle end to the telephoto end, the third lens unit L3 moves toward the object side and performs main magnification and the fourth lens unit L4 moves toward the object side and reduces (compensates) image plane fluctuation caused by the magnification. The first lens unit L1 moves toward the image side during zooming from the wide-angle end to a substantially intermediate position to reduce a distance between the aperture stop SP and the first lens unit L1, to thereby realize a reduction in the front lens diameter.

The first lens unit L1 includes a composite optical element including, in order from the object side, a positive lens element (first optical element) (a refracting surface on the image side has larger positive power than a refracting surface on the object side) and an optical element (second optical element) joined to the positive lens element and having negative refractive power. The second optical element is desirably made of a resin material. The first lens unit L1 also includes the composite optical element including the positive lens element and the optical element joined to the positive lens element and having negative refractive power in the third, fourth, fifth, sixth, and eighth embodiments described later.

In this embodiment, the composite optical element includes a first optical element G11 and a second optical element G12 (or multiple second optical elements G12) joined to the first optical element G11. The first optical element G11 and the second optical element (desirably, auxiliary lens made of resin) G12 jointed to the first optical element G11 satisfy a relation described below.

(A) The thickness of the first optical element on an optical axis is three times or more (desirably, five times or more) as large as the thickness of the second optical element on an optical axis. The thickness of the first optical element on the optical axis is desirably 100 times or less as large as the thickness of the second optical element on the optical axis.

(B) An absolute value of the refractive power (inverse of focal length) of the first optical element is twice or more (desirably, 2.5 times or more) as large as an absolute value of the refractive power of the second optical element. The absolute value of the refractive power (inverse of focal length) of the first optical element is 50 times or less (desirably, 40 times or less) as large as the absolute value of the refractive power of the second optical element.

The second lens unit L2 includes, in order from the object side, a negative biconcave lens element and a positive meniscus lens element having a convex shape facing toward the object side. In other words, in this embodiment, a negative lens component of the second lens unit L2 includes only the negative lens element. A material such as ceramics, having a refractive index N2n of which is 1.97500 and an Abbe number v2n of which is 39.5, is used for the negative lens element. Because the material of the negative lens element has a high refractive index, if the lens surfaces have the same curvature, occurrence of aberrations can be suppressed even if the refractive power of the negative lens is increased. Therefore, it is easy to increase a zoom ratio, and if magnification is the same, the curvatures of the lens surfaces can be relaxed. This makes it easy to improve optical performance and reduce the thickness of the second lens unit L2.

This material (ceramics) has a higher refractive index than the general optical glass material but has a large Abbe number (small dispersion). Therefore, lateral chromatic aberration at the wide-angle end can be satisfactorily corrected.

In this embodiment, a material such as k-PSFn214 (product name) of Sumita Optical Glass, Inc., having the refractive index N2p, 2.14352, and the Abbe number v2p, 17.8, is used for the positive lens element. Consequently, an increase in magnification in the positive lens element, improvement of optical performance, and a reduction in size of the entire system are realized. When lateral chromatic aberration at the wide-angle end is corrected by using the negative lens component and the positive lens element, in this embodiment, a material having a high refractive index and high dispersion is used as a material of the positive lens element. Consequently, a reduction in size of the entire system and aberration correction are effectively performed.

By using a high-refractive-index material for the lenses of the second lens unit L2, the zooming action of the second lens unit L2 is intensified and sharing amount of magnification of the other lens units is reduced to realize a zoom lens system having low eccentricity sensitivity.

In this embodiment, both surfaces of the negative lens component of the second lens unit L2 are formed in an aspherical shape to satisfactorily correct field curvature and distortion. Further, both surfaces of the positive lens element of the second lens unit L2 are formed in an aspherical shape to satisfactorily correct coma at the telephoto end.

In this embodiment, when focus is performed from an infinity object to a near distance object, the fourth lens unit L4 moves to the front side.

In this specification, the lens unit that performs main magnification refers to a lens unit that has a largest value of a ratio of a change in imaging magnification for zooming from the wide-angle end to the telephoto end compared with all the other lens units.

In the second embodiment illustrated in FIG. 5, a basic lens configuration including the number of lens units, signs of refractive powers of the lens units, and movement conditions of the lens units during zooming is the same as that in the first embodiment illustrated in FIG. 1.

A material such as an oxide ceramics material including yttrium aluminium garnet, having the refractive index N2n, 1.98730, and the Abbe number v2n, 36.6, is used for the negative lens element of the second lens unit L2. Optical elements (second optical elements) (desirably made of a resin material) having negative refractive power are arranged on the object side and the image side (or one of the object side and the image side) of the negative lens element (first optical element). The optical elements having negative refractive power are joined to the negative lens element of the second lens unit L2. In other words, in this embodiment, the negative lens component of the second lens unit L2 consists of the negative lens element (first optical element) and the second optical elements joined to the negative lens element.

Surfaces of the optical elements, in contact with the air, provided on the object side and the image side of the negative lens element of the second lens unit L2 are formed in aspherical shape. Surfaces on the object side and the image side of the positive lens element of the second lens unit L2 are formed in aspherical shape.

A material such as k-PSFn214 (product name) of Sumita Optical Glass, Inc., having the refractive index N2p, 2.14352, and the Abbe number v2p, 17.8, is used for the positive lens element of the second lens unit L2. An increase in magnification, improvement of optical performance, and a reduction in size of the entire system are realized by those materials as in the first embodiment.

In this embodiment, both surfaces of the negative lens component of the second lens unit L2 are formed in aspherical shape to satisfactorily correct field curvature and distortion. Further, both surfaces of the positive lens element of the second lens unit L2 are also formed in aspherical shape to satisfactorily correct coma at the telephoto end.

In the zoom lens system according to this embodiment, the aspherical surfaces are molded by using a resin material as a high-refractive material to thereby facilitate manufacturing. Focusing from an infinity object to a near distance object is performed by moving the fourth lens unit L4 toward the front side.

In the third embodiment illustrated in FIG. 9, a basic lens configuration, including the number of lens units, signs of refractive powers of the lens units, and movement conditions of the lens units for zooming, is the same as that of the first embodiment illustrated in FIG. 1.

A material such as an oxide ceramics material including yttrium aluminium garnet having the refractive index N2$n$, 2.16250, and the Abbe number ν2$n$, 34.8, is used for the negative lens element of the second lens unit L2. In this embodiment, the negative lens component of the second lens unit L2 includes only the negative lens element.

A material such as KT crystal (KTaO3) having the refractive index N2$p$, 2.23260 and the Abbe number ν2$p$, 16.9, is used for the positive lens element of the second lens unit L2.

An increase in magnification, improvement of optical performance, and a reduction in size of the entire system are realized by those materials as in the first embodiment.

In this embodiment, both surfaces of the negative lens component of the second lens unit L2 are formed in an aspherical shape to satisfactorily correct field curvature and distortion. Further, both surfaces of the positive lens element of the second lens unit L2 are also formed in an aspherical shape to satisfactorily correct coma at the telephoto end.

Focusing from an infinity object to a near distance object is performed by moving the fourth lens unit L4 toward the front side.

In the fourth embodiment illustrated in FIG. 13, a basic lens configuration, including the number of lens units, signs of refractive powers of the lens units, and movement conditions of the lens units for zooming, is the same as that of the first embodiment illustrated in FIG. 1.

A material such as an oxide ceramics material including yttrium aluminium garnet having the refractive index N2$n$, 1.98730, and the Abbe number ν2$n$, 36.6, is used for the negative lens element of the second lens unit L2. In this embodiment, the negative lens component of the second lens unit L2 consists of only the negative lens element.

A material such as KT crystal (KTaO3), the refractive index N2$p$, 2.23260, and the Abbe number ν2$p$, 16.9, is used for the positive lens element of the second lens unit L2.

An increase in magnification, improvement of optical performance, and a reduction in size of the entire system are realized by those materials as in the first embodiment.

In this embodiment, both surfaces of the negative lens component of the second lens unit L2 are formed in an aspherical shape to satisfactorily correct field curvature and distortion. Further, both surfaces of the positive lens element of the second lens unit L2 are also formed in an aspherical shape to satisfactorily correct coma at the telephoto end.

Focusing from an infinity object to a near distance object is performed by moving the fourth lens unit L4 toward the front side.

In the fifth embodiment illustrated in FIG. 17, a basic lens configuration, including the number of lens units, signs of refractive powers of the lens units, and movement conditions of the lens units for zooming, is the same as that of the first embodiment illustrated in FIG. 1.

A material such as an oxide ceramics material including yttrium aluminium garnet having the refractive index N2$n$, 1.83520, and the Abbe number ν2$n$, 53.0, is used for the negative lens element of the second lens unit L2. In this embodiment, the negative lens component of the second lens unit L2 includes only the negative lens element.

A material such as KT crystal (KTaO3) having the refractive index N2$p$, 2.23260, and the Abbe number ν2$p$, 16.9, is used for the positive lens element of the second lens unit L2.

An increase in magnification, improvement of optical performance, and a reduction in size of the entire system are realized by those materials as in the first embodiment.

In this embodiment, both surfaces of the negative lens component of the second lens unit L2 are formed in an aspherical shape to satisfactorily correct field curvature and distortion. Further, both surfaces of the positive lens element of the second lens unit L2 are also formed in an aspherical shape to satisfactorily correct coma at the telephoto end.

Focusing from an infinity object to a near distance object is performed by moving the fourth lens unit L4 toward the front side.

In the sixth embodiment illustrated in FIG. 21, a basic lens configuration, including the number of lens units, signs of refractive powers of the lens units, and movement conditions of the lens units for zooming, is the same as that of the first embodiment illustrated in FIG. 1.

A material such as an oxide ceramics material including yttrium aluminium garnet having the refractive index N2$n$, 1.97500, and the Abbe number ν2$n$, 39.5, is used for the negative lens element of the second lens unit L2. In this embodiment, the negative lens component of the second lens unit L2 includes only the negative lens element.

A material such as KT crystal (KTaO3) having the refractive index N2$p$, 2.23260, and the Abbe number ν2$p$, 16.9, is used for the positive lens element of the second lens unit L2.

An increase in magnification, improvement of optical performance, and a reduction in size of the entire system are realized by those materials as in the first embodiment.

In this embodiment, both surfaces of the negative lens component of the second lens unit L2 are formed in an aspherical shape to satisfactorily correct field curvature and distortion. Further, both surfaces of the positive lens element of the second lens unit L2 are also formed in an aspherical shape to satisfactorily correct coma at the telephoto end.

Focusing from an infinity object to a near distance object is performed by moving the fourth lens unit L4 toward the front side.

The seventh embodiment illustrated in FIG. 25 is a three-unit zoom lens system in which the entire system is formed by three lens units.

In the seventh embodiment, the zoom lens system includes, in order from the object side to the image side, the first lens unit L1 having positive refractive power, the second lens unit L2 having negative refractive power, and the third lens unit L3 having positive refractive power.

During zooming from the wide-angle end to the telephoto end, the first lens unit L1 moves along a locus convex to the image side. The second lens unit L2 moves along a locus convex to the image side to correct image plane fluctuation involved in magnification.

In this embodiment, both surfaces of the negative lens component of the second lens unit L2 are formed in an aspherical shape to satisfactorily correct field curvature and distortion. Further, both surfaces of the positive lens element of the second lens unit L2 are also formed in an aspherical shape to satisfactorily correct coma at the telephoto end.

The third lens unit L3 moves toward the object side to thereby perform main magnification. The first lens unit L1 moves toward the image side during zooming from the wide-angle end to the intermediate position to reduce a distance between the third lens unit L3 and the aperture stop SP, to thereby realize a reduction in the front lens diameter.

In this embodiment, the entire system includes the three lens units and the number of lenses of the lens units is a necessary minimum number, but oxide ceramics such as yttrium aluminium garnet is used for the negative lens of the second lens unit L2. In this embodiment, the negative lens component of the second lens unit L2 includes only the negative lens element. A high-refractive-index material such as KT crystal (KTaO3) is used for the positive lens element to realize a reduction in size of the entire system and improvement of optical performance by making use of the aspherical effect.

Focusing from an infinity object to a near distance object is performed by moving the second lens unit L2 toward the front side.

The eighth embodiment illustrated in FIG. 29 is a five-unit zoom lens system in which the entire system is formed by five lens units.

In the eighth embodiment, the zoom lens system includes, in order from the object side to the image side, the first lens unit L1 having positive refractive power, the second lens unit L2 having negative refractive power, the third lens unit L3 having positive refractive power, the fourth lens unit L4 having positive refractive power, and the fifth lens unit L5 having positive refractive power.

During zooming from the wide-angle end to the telephoto end, the first lens unit L1 moves along a locus convex to the image side.

The second lens unit L2 moves along a locus convex to the image side. The third lens unit L3 moves toward the object side to thereby perform main magnification. The fourth lens unit L4 moves toward the image side. The fifth lens unit L5 moves toward the object side to correct image plane fluctuation involved in magnification. The first lens unit L1 moves toward the image side during zooming from the wide-angle end to the intermediate position to thereby realize a reduction in the front lens diameter.

Both surfaces of the negative lens component of the second lens unit L2 are formed in aspherical shape.

Oxide ceramics such as yttrium aluminium garnet is used for the negative lens element of the second lens unit L2. In this embodiment, the negative lens component of the second lens unit L2 includes only the negative lens element. A high-refractive-index material such as k-PSFn214 (product name) of Sumita Optical Glass, Inc. is used for the positive lens element to realize a reduction in size of the entire system and improvement of optical performance by making use of the aspherical effect.

Focusing from an infinity object to a near distance object is performed by moving the fifth lens unit L5 toward the front side.

The ninth embodiment illustrated in FIG. 33 is a five-unit zoom lens system in which the entire system is formed by five lens units.

In the ninth embodiment, the zoom lens system includes, in order from the object side to the image side, the first lens unit L1 having positive refractive power, the second lens unit L2 having negative refractive power, the third lens unit L3 having positive refractive power, the fourth lens unit L4 having positive refractive power, and the fifth lens unit L5 having positive refractive power. During zooming from the wide-angle end to the telephoto end, the first lens unit L1 moves toward the object side. The second lens unit L2 moves toward the image side to thereby perform main magnification. The third lens unit L3 moves toward the object side. The fourth lens unit L4 moves toward the image side. The fifth lens unit L5 moves toward the object side to correct image plane fluctuation involved in magnification.

The image-side surface of the negative lens component of the second lens unit L2 is formed in aspherical shape.

Oxide ceramics such as yttrium aluminium garnet is used for the negative lens element of the second lens unit L2. In this embodiment, the negative lens component of the second lens unit L2 includes only the negative lens element. A high-refractive-index material such as k-PSFn214 (product name) of Sumita Optical Glass, Inc. is used for the positive lens element to realize a reduction in size of the entire system and improvement of optical performance by making use of the aspherical effect.

Focusing from an infinity object to a near distance object is performed by moving the fourth lens unit L4 toward the front side.

Numerical embodiments 1 to 9 corresponding to the first to ninth embodiments are described below. In the numerical embodiments, order of a surface from the object side is indicated by "i".

A curvature radius of an i-th lens surface (i-th surface) in the stated order from the object side is indicated by ri. An interval between the i-th surface and an (i+1)th surface is indicated by di. A refractive index and an Abbe number with respect to d-line are indicated by ndi and vdi, respectively.

In the numerical embodiments 1 to 8, two surfaces on the most image side are surfaces forming an optical block G.

In the numerical embodiments 1 and 3 to 7, a value of d8 is minus. In the numerical embodiment 2, a value of d9 is minus. This is because the aperture stop SP and the lens surface on the most object side of the third lens unit L3 are counted in the stated order from the object side.

When the lens surface has an aspherical shape, * is added after a curvature radius. A shape of the lens surface is represented as described below. A position in an optical axis direction is represented as X, a position in a direction orthogonal to the optical axis is represented as H, and a traveling direction of light is positive. A paraxial curvature radius is represented as R, a conic coefficient is represented as K, and aspherical coefficients are represented as A4, A6, A8, and A10, respectively.

The shape is represented by the following formula.

$$X = \frac{\left(\frac{1}{R}\right)H^2}{1+\sqrt{1-(1+k)\left(\frac{H}{R}\right)^2}} + A4H^4 + A6H^6 - A8H^8 + A10H^{10}$$

"E±N" indicates "×10^{±N}". A correspondence with the conditional expressions in the embodiments is illustrated in Table 1 below.

Numerical Embodiment 1 surface data

| surface number | r | d | nd | vd | Effective Diameter |
|---|---|---|---|---|---|
| 1 | 180.261 | 2.42 | 1.83520 | 53.0 | 19.99 |
| 2 | −40.168 | 0.05 | 1.62524 | 25.2 | 19.20 |
| 3* | −66.755 | (variable) | | | 18.58 |
| 4* | −192.436 | 0.70 | 1.97500 | 39.5 | 14.95 |
| 5* | 6.655 | 1.72 | | | 12.02 |
| 6* | 10.564 | 1.76 | 2.14352 | 17.8 | 12.23 |
| 7* | 18.246 | (variable) | | | 11.93 |
| 8 (stop) | ∞ | −0.60 | | | 5.58 |
| 9* | 5.875 | 1.74 | 1.58313 | 59.4 | 5.60 |
| 10* | −36.068 | 0.10 | | | 5.39 |
| 11 | 4.896 | 1.03 | 1.49700 | 81.5 | 5.01 |
| 12 | 7.344 | 0.50 | 1.84666 | 23.8 | 4.55 |
| 13 | 3.659 | (variable) | | | 4.05 |
| 14* | 13.943 | 1.60 | 1.86400 | 40.6 | 9.45 |
| 15* | 51.943 | (variable) | | | 9.53 |
| 16 | ∞ | 1.00 | 1.51633 | 64.1 | 15.00 |
| 17 | ∞ | | | | 15.00 | aspherical surface data third surface

K = −1.48383e+001  A4 = 2.56363e−007  A6 = −1.67200e−008
A8 = 2.50981e−010  A10 = −1.54032e−012 fourth surface

K = 0.00000e+000  A4 = 4.01501e−005  A6 = −9.08851e−007
A8 = −3.68035e−009  A10 = 5.08614e−012 fifth surface

K = −1.05492e−001  A4 = −3.14360e−004  A6 = 7.05223e−006
A8 = 3.60471e−008  A10 = −7.80864e−009 sixth surface

K = 0.00000e+000  A4 = −3.72937e−004  A6 = 5.73585e−006
A8 = 5.14023e−008  A10 = −1.63039e−009 seventh surface

K = 0.00000e+000  A4 = −3.32840e−004  A6 = 2.20480e−006
A8 = 7.67983e−008  A10 = −1.71934e−009 ninth surface

K = 3.42500e−001  A4 = −6.02990e−004  A6 = −1.32764e−005
A8 = −5.92384e−007 tenth surface

K = −1.62065e+001  A4 = 1.69106e−004  A6 = −1.38644e−006 fourteenth surface

K = −6.01479e+000  A4 = −3.26847e−004  A6 = −2.91859e−006
A8 = −1.21310e−008  A10 = −2.71496e−009 fifteenth surface

K = 0.00000e+000  A4 = −7.20398e−004  A6 = 2.24396e−006
A8 = −1.24510e−008  A10 = −2.64574e−009 various data

| | | | |
|---|---|---|---|
| focal length | 5.25 | 15.61 | 35.17 |
| f-number | 2.76 | 3.89 | 5.60 |
| field angle | 36.40 | 13.92 | 6.28 |
| d3 | 0.66 | 10.03 | 18.40 |
| d7 | 23.28 | 7.27 | 2.54 |
| d13 | 7.86 | 12.90 | 24.20 |
| d15 | 1.37 | 4.28 | 4.52 |

Numerical Embodiment 2 surface data

| surface number | r | d | nd | vd | effective diameter |
|---|---|---|---|---|---|
| 1 | 205.886 | 2.42 | 1.83520 | 53.0 | 20.44 |
| 2* | −60.783 | (variable) | | | 19.30 |
| 3* | −125.455 | 0.05 | 1.63555 | 22.7 | 14.83 |
| 4 | 2463.893 | 0.80 | 1.98730 | 36.6 | 14.62 |
| 5 | 7.449 | 0.05 | 1.52415 | 51.5 | 11.69 |
| 6* | 6.241 | 1.98 | | | 11.59 |
| 7* | 10.936 | 1.93 | 2.14352 | 17.8 | 11.77 |
| 8* | 18.946 | (variable) | | | 11.44 |
| 9(stop) | ∞ | −0.60 | | | 5.32 |
| 10* | 5.541 | 1.74 | 1.58913 | 61.1 | 5.34 |
| 11* | −30.842 | 0.10 | | | 5.12 |
| 12 | 5.257 | 1.03 | 1.49700 | 81.5 | 4.77 |
| 13 | 8.588 | 0.50 | 1.80518 | 25.4 | 4.31 |
| 14 | 3.611 | (variable) | | | 3.83 |
| 15* | 13.105 | 1.60 | 1.86400 | 40.6 | 10.26 |
| 16* | 49.433 | (variable) | | | 10.20 |
| 17 | ∞ | 1.00 | 1.51633 | 64.1 | 15.00 |
| 18 | ∞ | | | | 15.00 | aspherical surface data second surface

K = −4.20005e+000  A4 = 1.42490e−006  A6 = −2.00813e−008
A8 = 4.45186e−010  A10 = −3.30563e−012 third surface

K = 0.00000e+000  A4 = 1.89494e−004  A6 = −3.47818e−006
A8 = 9.55476e−009  A10 = −1.03020e−011 sixth surface

K = −9.01718e−002  A4 = −6.19642e−004  A6 = 2.54660e−005
A8 = −1.20602e−007  A10 = −1.77057e−008 seventh surface

K = 0.00000e+000  A4 = −5.03560e−004  A6 = 1.11097e−005
A8 = 6.13466e−008  A10 = −3.96253e−009 eighth surface

K = 0.00000e+000  A4 = −4.52562e−004  A6 = 7.86727e−006
A8 = −3.30406e−008  A10 = −1.92857e−009 tenth surface

K = 1.95352e−001  A4 = −5.92223e−004  A6 = −2.55189e−005
A8 = −6.20806e−007 eleventh surface

K = −4.70195e+001  A4 = 1.13523e−004  A6 = −1.83237e−005
A8 = 5.13481e−007 fifteenth surface

K = −2.41767e+000  A4 = 5.46963e−005  A6 = −3.80283e−006
A8 = 2.22888e−007  A10 = −9.22607e−009 sixteenth surface

K = 0.00000e+000  A4 = −1.00773e−004  A6 = −1.77791e−006
A8 = 7.88637e−008  A10 = −6.45996e−009 various data

| | | | |
|---|---|---|---|
| focal length | 5.13 | 14.66 | 32.32 |
| f-number | 2.77 | 3.93 | 5.66 |
| field angle | 37.03 | 14.78 | 6.83 |
| d2 | 0.66 | 9.54 | 18.17 |
| d8 | 21.56 | 6.38 | 1.74 |
| d14 | 6.93 | 11.92 | 23.85 |
| d16 | 2.47 | 5.39 | 6.71 |

Numerical Embodiment 3 surface data

| surface number | r | d | nd | vd | effective diameter |
|---|---|---|---|---|---|
| 1 | 160.365 | 2.42 | 1.83520 | 53.0 | 20.29 |
| 2 | −51.200 | 0.05 | 1.62524 | 25.2 | 19.33 |
| 3* | −101.718 | (variable) | | | 18.74 |
| 4* | 53.350 | 0.80 | 2.16250 | 34.8 | 14.67 |
| 5* | 6.669 | 1.92 | | | 11.78 |
| 6* | 11.071 | 1.93 | 2.23260 | 16.9 | 12.09 |
| 7* | 18.885 | (variable) | | | 11.75 |
| 8(stop) | ∞ | −0.60 | | | 5.26 |
| 9* | 5.993 | 1.74 | 1.56907 | 71.3 | 5.26 |
| 10* | −27.258 | 0.10 | | | 5.05 |
| 11 | 4.547 | 1.03 | 1.49700 | 81.5 | 4.72 |
| 12 | 6.000 | 0.50 | 1.84666 | 23.8 | 4.24 |
| 13 | 3.454 | (variable) | | | 3.79 |
| 14* | 14.374 | 1.60 | 1.86400 | 40.6 | 7.92 |
| 15* | 31.531 | (variable) | | | 7.97 |
| 16 | ∞ | 1.00 | 1.51633 | 64.1 | 15.00 |
| 17 | ∞ | | | | 15.00 | aspherical surface data third surface

K = −1.48416e+001   A4 = 3.02750e−006   A6 = −2.03458e−008
A8 = 2.50782e−010   A10 = −1.54032e−012 fourth surface

K = 0.00000e+000   A4 = 1.58639e−005   A6 = −9.08843e−007
A8 = −3.68035e−009   A10 = 5.08614e−012 fifth surface

K = −1.07694e−001   A4 = −2.55917e−004   A6 = 7.05217e−006
A8 = 3.60471e−008   A10 = −7.80864e−009 sixth surface

K = 0.00000e+000   A4 = −3.76209e−004   A6 = 5.73616e−006
A8 = 5.14023e−008   A10 = −1.63039e−009 seventh surface

K = 0.00000e+000   A4 = −3.67155e−004   A6 = 2.20449e−006
A8 = 7.67983e−008   A10 = −1.71934e−009 ninth surface

K = 3.81628e−001   A4 = −6.15598e−004   A6 = −1.32764e−005
A8 = −5.92384e−007 tenth surface

K = −1.62077e+001   A4 = 1.38585e−004   A6 = −1.38644e−006 fourteenth surface

K = −6.17633e+000   A4 = −3.39938e−004   A6 = −2.91859e−006
A8 = −1.21310e−008   A10 = −2.71496e−009 fifteenth surface

K = 0.00000e+000   A4 = −7.32840e−004   A6 = 2.24396e−006
A8 = −1.24510e−008   A10 = −2.64574e−009 various data

| | | | |
|---|---|---|---|
| focal length | 5.13 | 15.36 | 34.37 |
| f-number | 2.88 | 4.06 | 5.37 |
| field angle | 37.03 | 14.14 | 6.42 |
| d3 | 0.66 | 12.38 | 25.04 |
| d7 | 22.84 | 6.68 | 1.50 |
| d13 | 8.12 | 11.25 | 16.40 |
| d15 | 1.30 | 4.81 | 7.38 |

Numerical Embodiment 4 surface data

| surface number | r | d | nd | vd | effective diameter |
|---|---|---|---|---|---|
| 1 | 98.036 | 2.42 | 1.75500 | 71.5 | 20.46 |
| 2 | −67.757 | 0.05 | 1.52415 | 51.5 | 19.38 |
| 3* | −81.870 | (variable) | | | 19.14 |
| 4* | −691.037 | 0.80 | 1.98730 | 36.6 | 15.47 |
| 5* | 6.621 | 1.79 | | | 12.28 |
| 6* | 11.236 | 1.93 | 2.23260 | 16.9 | 12.34 |
| 7* | 19.132 | (variable) | | | 12.04 |
| 8(stop) | ∞ | −0.60 | | | 5.40 |
| 9* | 5.816 | 1.74 | 1.56907 | 71.3 | 5.40 |
| 10* | −30.880 | 0.10 | | | 5.21 |
| 11 | 5.168 | 1.03 | 1.49700 | 81.5 | 4.89 |
| 12 | 6.392 | 0.50 | 1.80809 | 22.8 | 4.40 |
| 13 | 3.651 | (variable) | | | 3.97 |
| 14* | 15.329 | 1.60 | 1.86400 | 40.6 | 9.34 |
| 15* | 61.377 | (variable) | | | 9.59 |
| 16 | ∞ | 1.00 | 1.51633 | 64.1 | 15.00 |
| 17 | ∞ | | | | 15.00 | aspherical surface data third surface

K = −6.65055e−001   A4 = 2.04714e−006   A6 = 2.08825e−008
A8 = −7.93176e−011   A10 = −1.23823e−012 fourth surface

K = 0.00000e+000   A4 = 3.76401e−005   A6 = −5.36942e−007
A8 = −3.11164e−009   A10 = −4.27360e−011 fifth surface

K = −1.49852e−001   A4 = −3.17284e−004   A6 = 1.15480e−005
A8 = −5.35830e−009   A10 = −7.66093e−009 sixth surface

K = 0.00000e+000   A4 = −4.39203e−004   A6 = 1.00183e−005
A8 = 1.67216e−008   A10 = −2.19497e−009 seventh surface

K = 0.00000e+000   A4 = −4.17279e−004   A6 = 6.47470e−006
A8 = 2.13212e−008   A10 = −2.20793e−009 ninth surface

K = 1.53619e−001   A4 = −5.27241e−004   A6 = −1.26186e−005
A8 = −6.35361e−007 tenth surface

K = −3.50862e+001   A4 = 7.37124e−005   A6 = −5.06898e−006
A8 = −9.65442e−008 fourteenth surface

K = −6.21752e+000   A4 = −5.72975e−004   A6 = −7.36094e−006
A8 = 5.41108e−007   A10 = −2.44148e−008 fifteenth surface

K = 0.00000e+000   A4 = −9.41787e−004   A6 = 2.03926e−006
A8 = 1.77260e−007   A10 = −1.32476e−008 various data

| | | | |
|---|---|---|---|
| focal length | 5.13 | 16.23 | 36.94 |
| f-number | 2.74 | 4.03 | 5.88 |
| field angle | 37.03 | 13.41 | 5.98 |
| d3 | 0.66 | 10.55 | 19.66 |
| d7 | 22.63 | 6.06 | 1.54 |
| d13 | 7.15 | 12.37 | 24.17 |
| d15 | 1.86 | 5.00 | 5.56 |

Numerical Embodiment 5 surface data

| surface number | r | d | nd | vd | effective diameter |
|---|---|---|---|---|---|
| 1 | 130.429 | 2.42 | 1.83520 | 53.0 | 20.13 |
| 2 | −42.262 | 0.05 | 1.62524 | 25.2 | 19.37 |
| 3* | −92.408 | (variable) | | | 18.60 |
| 4* | −119.469 | 0.80 | 1.83520 | 53.0 | 15.00 |
| 5* | 6.742 | 2.52 | | | 11.55 |
| 6* | 12.805 | 1.79 | 2.23260 | 16.9 | 11.54 |
| 7* | 17.589 | (variable) | | | 11.25 |
| 8(stop) | ∞ | −0.60 | | | 5.71 |
| 9* | 5.695 | 1.74 | 1.56907 | 71.3 | 5.75 |
| 10* | −24.451 | 0.10 | | | 5.57 |
| 11 | 5.205 | 1.03 | 1.49700 | 81.5 | 5.16 |
| 12 | 6.718 | 0.50 | 1.84666 | 23.8 | 4.65 |
| 13 | 3.686 | (variable) | | | 4.16 |
| 14* | 16.461 | 1.60 | 1.86400 | 40.6 | 8.76 |
| 15* | 68.918 | (variable) | | | 9.21 |
| 16 | ∞ | 1.00 | 1.51633 | 64.1 | 15.00 |
| 17 | ∞ | | | | 15.00 | aspherical surface data third surface

K = 4.02570e+000  A4 = 2.57307e−006  A6 = −5.48547e−008
A8 = 1.70269e−009  A10 = −1.39215e−011 fourth surface

K = 0.00000e+000  A4 = 1.80934e−004  A6 = −2.98911e−006
A8 = 6.71609e−009  A10 = 6.06367e−012 fifth surface

K = 4.92328e−002  A4 = −1.35892e−004  A6 = 4.76631e−006
A8 = 9.24951e−008  A10 = −1.29227e−008 sixth surface

K = 0.00000e+000  A4 = −4.97175e−004  A6 = 4.57313e−006
A8 = −7.32617e−009  A10 = −1.20111e−009 seventh surface

K = 0.00000e+000  A4 = −5.46487e−004  A6 = 1.89096e−006
A8 = 8.82915e−008  A10 = −2.32868e−009 ninth surface

K = −7.86031e−003  A4 = −5.15543e−004  A6 = −1.49767e−005
A8 = 3.07034e−007 tenth surface

K = −9.28821e+000  A4 = 1.43436e−004  A6 = −5.85147e−006
A8 = 5.39540e−007 fourteenth surface

K = −1.22705e+001  A4 = −5.55275e−004  A6 = −3.57614e−005
A8 = 1.26339e−006  A10 = −5.48372e−008 fifteenth surface

K = 0.00000e+000  A4 = −1.14930e−003  A6 = −8.90277e−006
A8 = 3.21463e−008  A10 = −1.26907e−008 various data

| | | | |
|---|---|---|---|
| focal length | 5.13 | 16.93 | 38.99 |
| f-number | 2.60 | 3.95 | 5.81 |
| field angle | 37.03 | 12.88 | 5.67 |
| d3 | 0.66 | 9.44 | 19.16 |
| d7 | 21.52 | 4.79 | 0.86 |
| d13 | 7.51 | 12.91 | 24.75 |
| d15 | 1.41 | 4.99 | 4.39 |

Numerical Embodiment 6 surface data

| surface number | r | d | nd | vd | effective diameter |
|---|---|---|---|---|---|
| 1 | 104.101 | 2.72 | 1.83520 | 53.0 | 20.51 |
| 2 | −37.751 | 0.05 | 1.62524 | 25.2 | 19.71 |
| 3* | −76.547 | (variable) | | | 18.74 |
| 4* | −79.361 | 0.80 | 1.97500 | 39.5 | 14.91 |
| 5* | 6.667 | 1.72 | | | 11.87 |
| 6* | 11.421 | 1.93 | 2.23260 | 16.9 | 11.98 |
| 7* | 19.378 | (variable) | | | 11.61 |
| 8(stop) | ∞ | −0.60 | | | 5.71 |
| 9* | 5.955 | 1.74 | 1.56907 | 71.3 | 5.74 |
| 10* | −26.905 | 0.10 | | | 5.57 |
| 11 | 4.894 | 1.03 | 1.49700 | 81.5 | 5.18 |
| 12 | 6.594 | 0.50 | 1.84666 | 23.8 | 4.70 |
| 13 | 3.662 | (variable) | | | 4.21 |
| 14* | 12.826 | 1.60 | 1.86400 | 40.6 | 9.63 |
| 15* | 34.161 | (variable) | | | 9.69 |
| 16 | ∞ | 1.00 | 1.51633 | 64.1 | 15.00 |
| 17 | ∞ | | | | 15.00 | aspherical surface data third surface

K = −1.48466e+001  A4 = 2.87228e−006  A6 = −8.79263e−009
A8 = 2.51719e−010  A10 = −1.54032e−012 fourth surface

K = 0.00000e+000  A4 = 5.37280e−005  A6 = −9.08964e−007
A8 = −3.68035e−009  A10 = 5.08614e−012 fifth surface

K = −1.19849e−001  A4 = −2.98474e−004  A6 = 7.05238e−006
A8 = 3.60471e−008  A10 = −7.80864e−009 sixth surface

K = 0.00000e+000  A4 = −3.75392e−004  A6 = 5.73545e−006
A8 = 5.14023e−008  A10 = −1.63039e−009 seventh surface

K = 0.00000e+000  A4 = −3.67488e−004  A6 = 2.20513e−006
A8 = 7.67983e−008  A10 = −1.71934e−009 ninth surface

K = 3.45515e−001  A4 = −6.33851e−004  A6 = −1.32764e−005
A8 = −5.92384e−007 tenth surface

K = −1.61756e+001  A4 = 1.15946e−004  A6 = −1.38644e−006 fourteenth surface

K = −5.73577e+000  A4 = −3.12460e−004  A6 = −2.91859e−006
A8 = −1.21310e−008  A10 = −2.71496e−009 fifteenth surface

K = 0.00000e+000  A4 = −7.57966e−004  A6 = 2.24396e−006
A8 = −1.24510e−008  A10 = −2.64574e−009 various data

| | | | |
|---|---|---|---|
| focal length | 5.00 | 18.03 | 43.00 |
| f-number | 2.61 | 4.00 | 5.69 |
| field angle | 37.74 | 12.11 | 5.14 |
| d3 | 0.66 | 9.59 | 18.27 |
| d7 | 22.33 | 5.20 | 0.87 |
| d13 | 7.90 | 13.84 | 25.66 |
| d15 | 1.36 | 5.35 | 5.77 |

Numerical Embodiment 7 surface data

| surface number | r | d | nd | vd | effective diameter |
|---|---|---|---|---|---|
| 1 | 33.840 | 2.92 | 1.83520 | 53.0 | 22.40 |
| 2 | -242.802 | 0.05 | 1.62524 | 25.2 | 21.48 |
| 3* | 58.806 | (variable) | | | 19.75 |
| 4* | 17.056 | 0.80 | 1.97500 | 39.5 | 16.73 |
| 5* | 4.508 | 2.33 | | | 12.82 |
| 6* | 10.730 | 1.93 | 2.23260 | 16.9 | 12.90 |
| 7* | 16.666 | (variable) | | | 12.31 |
| 8(stop) | ∞ | -1.10 | | | 5.58 |
| 9* | 4.036 | 2.84 | 1.56907 | 71.3 | 5.58 |
| 10 | -21.960 | 0.10 | | | 4.88 |
| 11 | 16.480 | 0.50 | 1.82114 | 24.1 | 4.54 |
| 12* | 5.888 | (variable) | | | 4.08 |
| 13 | ∞ | 1.00 | 1.51633 | 64.1 | 15.00 |
| 14 | ∞ | | | | 15.00 | aspherical surface data third surface

K = 2.05530e+001   A4 = -2.21950e-006   A6 = 6.34133e-009
A8 = -1.08278e-009   A10 = 2.44925e-012 fourth surface

K = -1.71421e+001   A4 = -3.19288e-004   A6 = 4.02700e-006
A8 = -1.65249e-008   A10 = -5.50482e-011 fifth surface

K = -9.60144e-001   A4 = -4.32507e-004   A6 = 2.41405e-005
A8 = -4.52161e-007   A10 = 1.41330e-009 sixth surface

K = -8.74539e-001   A4 = -1.42379e-004   A6 = 6.94853e-006
A8 = 1.71842e-008 seventh surface

K = 1.63677e+000   A4 = -4.10464e-004   A6 = 6.07671e-006
A8 = 2.90225e-008   A10 = 6.97009e-010 ninth surface

K = -1.77231e-001   A4 = 8.18911e-005   A6 = -6.95549e-006
A8 = 1.18829e-006   A10 = -1.59233e-007 twelfth surface

K = 1.34892e+000   A4 = 2.21595e-003   A6 = 3.26756e-004
A8 = -3.58921e-005   A10 = 9.31966e-006 various data

| | | | |
|---|---|---|---|
| focal length | 5.00 | 12.07 | 29.50 |
| f-number | 2.62 | 3.42 | 5.80 |
| field angle | 37.73 | 17.78 | 7.47 |
| d3 | 1.56 | 12.04 | 12.71 |
| d7 | 22.10 | 9.57 | 1.87 |
| d12 | 8.09 | 11.56 | 21.75 |

Numerical Embodiment 8 surface data

| surface number | r | d | nd | vd | effective diameter |
|---|---|---|---|---|---|
| 1 | 27.308 | 3.60 | 1.75500 | 71.5 | 21.52 |
| 2 | -243.826 | 0.05 | 1.62524 | 25.2 | 20.10 |
| 3* | 17050.150 | (variable) | | | 19.72 |
| 4* | 342.642 | 0.80 | 1.83520 | 53.0 | 16.40 |
| 5* | 5.915 | 1.52 | | | 11.87 |
| 6 | 8.642 | 1.82 | 2.14352 | 17.8 | 11.83 |
| 7 | 9.914 | (variable) | | | 10.80 |
| 8(stop) | ∞ | 0.10 | | | 4.30 |
| 9* | 8.730 | 2.20 | 1.78590 | 44.2 | 4.35 |
| 10 | -120.732 | 0.91 | 1.68893 | 31.1 | 4.12 |
| 11* | 8.326 | (variable) | | | 3.98 |
| 12 | 43.351 | 1.74 | 1.69680 | 55.5 | 4.12 |
| 13 | -6.370 | 0.10 | | | 4.20 |
| 14 | 935.073 | 0.50 | 1.80518 | 25.4 | 4.18 |
| 15 | 10.218 | (variable) | | | 4.24 |
| 16* | 15.885 | 1.99 | 1.86400 | 40.6 | 11.83 |
| 17 | -172.233 | (variable) | | | 11.71 |
| 18 | ∞ | 1.00 | 1.51633 | 64.1 | 15.00 |
| 19 | ∞ | | | | 15.00 | aspherical surface data third surface

K = -6.34516e+011   A4 = 4.29447e-006   A6 = -2.53297e-008
A8 = 2.06264e-010   A10 = -6.71335e-013 fourth surface

K = 1.29095e+003   A4 = -5.22927e-005   A6 = 2.08314e-007
A8 = 1.32657e-009   A10 = -2.07333e-011 fifth surface

K = -6.51524e-001   A4 = 6.91311e-005   A6 = 6.20573e-007
A8 = -2.35829e-008   A10 = 4.68570e-010 ninth surface

K = 0.00000e+000   A4 = -6.43062e-004   A6 = -2.09563e-005
A8 = -4.94178e-006   A10 = 3.40676e-007 eleventh surface

K = -4.75553e+000   A4 = 1.47296e-003   A6 = -7.54988e-005 sixteenth surface

K = 1.20175e+000   A4 = -4.41475e-005   A6 = -3.36407e-007
A8 = -2.79200e-009 various data

| | | | |
|---|---|---|---|
| focal length | 5.25 | 15.50 | 34.40 |
| f-number | 2.88 | 3.89 | 4.75 |
| field angle | 36.40 | 14.02 | 6.42 |
| d3 | 0.88 | 7.49 | 15.91 |
| d7 | 17.65 | 3.57 | 1.66 |
| d11 | 0.98 | 1.47 | 1.71 |
| d15 | 0.86 | 5.64 | 21.70 |
| d17 | 7.10 | 10.99 | 7.99 |

Numerical Embodiment 9 surface data

| surface number | r | d | nd | vd | effective diameter |
|---|---|---|---|---|---|
| 1 | 146.781 | 2.70 | 1.80518 | 25.4 | 54.09 |
| 2 | 93.718 | 7.20 | 1.49700 | 81.5 | 53.11 |
| 3 | -249.902 | 0.20 | | | 52.76 |
| 4 | 63.350 | 4.40 | 1.48749 | 70.2 | 50.21 |
| 5 | 120.233 | (variable) | | | 49.28 |
| 6 | -58.541 | 1.40 | 1.83520 | 53.0 | 26.42 |
| 7* | 121.302 | 2.06 | | | 26.42 |
| 8 | 122.463 | 3.60 | 2.14352 | 17.8 | 26.82 |
| 9 | 448.950 | (variable) | | | 26.73 |
| 10(stop) | ∞ | 3.52 | | | 26.74 |
| 11 | -457.626 | 1.60 | 1.84666 | 23.8 | 26.76 |
| 12 | 104.693 | 2.60 | | | 26.84 |

-continued

| | | | | |
|---|---|---|---|---|
| 13 | 99.072 | 5.30 | 1.62230 | 53.2 | 27.60 |
| 14 | −46.168 | (variable) | | | 27.73 |
| 15 | 39.901 | 6.50 | 1.48749 | 70.2 | 25.95 |
| 16 | −40.538 | 1.40 | 1.83400 | 37.2 | 25.16 |
| 17 | −99.552 | (variable) | | | 24.79 |
| 18 | −147.331 | 1.10 | 1.83481 | 42.7 | 19.15 |
| 19 | 44.645 | 1.15 | | | 19.22 |
| 20 | −730.875 | 1.10 | 1.83481 | 42.7 | 19.24 |
| 21 | 22.881 | 2.90 | 1.76182 | 26.5 | 20.10 |
| 22 | −831.900 | | | | 20.25 | aspherical surface data seventh surface

K = −6.71946e+000   A4 = 5.52592e−007   A6 = 6.30710e−010
A8 = −2.89235e−012  A10 = 2.99810e−015 various data

| | | | |
|---|---|---|---|
| focal length | 103.00 | 165.01 | 293.00 |
| f-number | 4.60 | 4.84 | 5.60 |
| field angle | 11.86 | 7.47 | 4.22 |
| d5 | 3.65 | 31.26 | 65.20 |
| d9 | 28.64 | 11.37 | 0.98 |
| d14 | 3.03 | 19.35 | 27.27 |
| d17 | 30.50 | 22.00 | 0.99 |

TABLE 1

| | Conditional expression 1 (N2n) | Conditional expression 2 (ν2n) | Conditional expression 3 |
|---|---|---|---|
| Embodiment 1 | 2.50 | 39.5 | 2.05926 |
| Embodiment 2 | 2.48 | 36.6 | 2.06541 |
| Embodiment 3 | 2.64 | 34.8 | 2.19755 |
| Embodiment 4 | 2.48 | 36.6 | 2.10995 |
| Embodiment 5 | 2.47 | 53.0 | 2.03390 |
| Embodiment 6 | 2.50 | 39.5 | 2.10380 |
| Embodiment 7 | 2.50 | 39.5 | 2.10380 |
| Embodiment 8 | 2.47 | 53.0 | 1.98936 |
| Embodiment 9 | 2.47 | 53.0 | 1.98936 |

| | Conditional expression 4 | Conditional expression 5 | Conditional expression 6 | Conditional expression 7 | Conditional expression 8 |
|---|---|---|---|---|---|
| Embodiment 1 | 0.80 | 2.22 | −0.34 | 6.70 | 1.77 |
| Embodiment 2 | 0.94 | 2.06 | −0.38 | 6.30 | 1.64 |
| Embodiment 3 | 0.91 | 2.06 | −0.35 | 6.70 | 1.85 |
| Embodiment 4 | 0.88 | 2.17 | −0.34 | 7.20 | 1.72 |
| Embodiment 5 | 1.00 | 3.14 | −0.24 | 7.60 | 1.73 |
| Embodiment 6 | 0.89 | 2.34 | −0.32 | 8.60 | 1.99 |
| Embodiment 7 | 1.01 | 2.34 | −0.31 | 5.90 | 1.97 |
| Embodiment 8 | 0.79 | 2.98 | −0.22 | 6.55 | 2.86 |
| Embodiment 9 | 0.07 | 2.98 | −0.32 | 2.84 | 2.99 |

| | Conditional expression 9 | Conditional expression 10 | Conditional expression 11 |
|---|---|---|---|
| Embodiment 1 | 4.69 | −2.00 | −4.97 |
| Embodiment 2 | 5.42 | −2.06 | −5.34 |
| Embodiment 3 | 4.80 | −2.11 | −6.01 |
| Embodiment 4 | 5.28 | −2.08 | −5.39 |
| Embodiment 5 | 5.16 | −2.02 | −5.35 |
| Embodiment 6 | 5.71 | −1.93 | −4.81 |
| Embodiment 7 | 7.08 | −2.01 | −6.50 |
| Embodiment 8 | 0.69 | −1.64 | −4.13 |
| Embodiment 9 | 0.40 | −0.69 | −1.79 |

An embodiment of a digital still camera in which the zoom lens system according to the present invention is used as a shooting optical system is described with reference to FIG. 37.

In FIG. 37, the digital still camera includes a camera main body 20 and a shooting optical system 21 constituted by the zoom lens system described in any one of the first to ninth embodiments.

A solid-state image pickup element (photoelectric transducer) 22 such as a CCD sensor or a CMOS sensor is incorporated in the camera main body 20 and receives light of an object image formed by the shooting optical system 21. A memory 23 records information corresponding to the object image photoelectrically converted by the solid-state image pickup element 22.

A finder 24 is constituted by a liquid crystal display panel or the like and is used for observing the object image formed on the solid-state image pickup element 22.

The zoom lens system according to any one of the embodiments of the present invention is applied to a camera such as the digital still camera, whereby a small camera having high optical performance is realized.

The zoom lens system according to any one of the embodiments of the present invention can also be applied to a video camera, a TV camera, a silver-halide film camera, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-145623, filed Jun. 3, 2008, which is hereby incorporated by reference herein in its entirety.

What is claimed is:

1. A zoom lens system, comprising, in order from an object side to an image side:

a first lens unit having positive optical power;

a second lens unit having negative optical power; and a rear unit including at least one lens unit, wherein at least two lens units move during zooming so that intervals between the lens units adjacent to each other change;

wherein the second lens unit consists of a negative lens component formed of at least one material and a positive lens element, which are arranged in the stated order from the object side to the image side; and wherein the following conditions are satisfied:

$$2.45 < N2n - (9.3 \times 10^{-5} \times \nu 2n^2 - 1.70 \times 10^{-2} \times \nu 2n) < 3.00;$$

$$5 < \nu 2n < 80; \text{ and}$$

$$1.98 < (N2n + N2p)/2 < 2.25,$$

where $N2n$ represents a refractive index of the at least one material forming the negative lens component with respect to d-line, $\nu 2n$ represents an Abbe number of the at least one material forming the negative lens component, and $N2p$ represents a refractive index of a material forming the positive lens element with respect to d-line.

2. A zoom lens system according to claim 1, wherein the following condition is satisfied, $$0.05 < D2/fw < 1.2,$$

where $D2$ represents a distance from a surface of the second lens unit on a most object side to a surface of the second lens unit on a most image side, and $fw$ represents a focal length of the zoom lens system at a wide-angle end.

3. A zoom lens system according to claim 1, wherein the following condition is satisfied, $$1.98 < \nu 2n/\nu 2p < 3.2,$$

where $\nu 2p$ represents an Abbe number of a material forming the positive lens element of the second lens unit.

4. A zoom lens system according to claim 1, wherein the following condition is satisfied, $$-0.4 < f2n/f2p < -0.2,$$

where $f2n$ and $f2p$ represent focal lengths of the negative lens component and the positive lens element of the second lens unit, respectively.

5. A zoom lens system according to claim 1, wherein the following condition is satisfied, $$2.8 < ft/fw < 10,$$

where $fw$ and $ft$ represent focal lengths of the zoom lens system at a wide-angle end and at a telephoto end, respectively.

6. A zoom lens system according to claim 1, wherein:

the rear unit includes a third lens unit having positive optical power;

during zooming, the first lens unit moves to be located more on the object side at a telephoto end than at a wide-angle end;

the interval between the first lens unit and the second lens unit is larger at the telephoto end than at the wide-angle end, and an interval between the second lens unit and the third lens unit is smaller at the telephoto end than at the wide-angle end; and the following conditions are satisfied:

$$1.5 < |\beta 2t/\beta 2w| < 3.2; \text{ and}$$

$$0.3 < |\beta 3t/\beta 3w| < 7.1,$$

where $\beta 2w$ and $\beta 2t$ represent lateral magnifications of the second lens unit at the wide-angle end and at the telephoto end, respectively, and $\beta 3w$ and $\beta 3t$ represent lateral magnifications of the third lens unit at the wide-angle end and at the telephoto end, respectively.

7. A zoom lens system according to claim 1, wherein the following conditions are satisfied:

$$-2.5 < f2/fw < -0.5; \text{ and}$$

$$-6.8 < f1/f2 < -1.7,$$

where $f1$ and $f2$ represent focal lengths of the first lens unit and the second lens unit, respectively, and $fw$ represents a focal length of the zoom lens system at a wide-angle end.

8. A camera, comprising:

the zoom lens system according to claim 1; and a solid-state image pickup element that receives light of an image formed by the zoom lens system.

* * * * *